United States Patent [19]

Jean-Jumeau et al.

[11] Patent Number: 5,642,000
[45] Date of Patent: Jun. 24, 1997

[54] METHOD FOR PREVENTING POWER COLLAPSE IN ELECTRIC POWER SYSTEMS

[75] Inventors: Rene Jean-Jumeau, Sarasota, Fla.; Hsiao-Dong Chiang, Ithaca, N.Y.

[73] Assignee: Cornell Research Foundation, Inc., Ithaca, N.Y.

[21] Appl. No.: 55,334

[22] Filed: May 3, 1993

[51] Int. Cl.⁶ ............................................. H02J 3/18
[52] U.S. Cl. .......................... 307/31; 364/492; 364/493
[58] Field of Search ............................. 307/31, 66, 64, 307/38, 39; 363/95; 364/480, 491, 492, 493

[56] References Cited

U.S. PATENT DOCUMENTS

| | | | |
|---|---|---|---|
| 4,181,950 | 1/1980 | Carter, II | 364/492 |
| 4,549,274 | 10/1985 | Lerner et al. | 364/492 |
| 4,612,619 | 9/1986 | Culp | 364/492 |
| 4,694,192 | 9/1987 | Payne | 364/492 |
| 4,794,272 | 12/1988 | Bavaro et al. | 307/66 |
| 4,868,410 | 9/1989 | Nakamura | 364/492 |

Primary Examiner—William M. Shoop, Jr.
Assistant Examiner—Peter Ganjoo
Attorney, Agent, or Firm—Salzman & Levy

[57] ABSTRACT

The present invention features a method for determining a performance index for each power-generating system, directly correlated to load demands. This performance index can be easily interpreted by power engineers and operators, so that weak areas and potential voltage collapse conditions can be predicted and corrected. When the underlying cause of collapse is due to load variations, the performance index of the current invention has the ability to assess the amount of load increase that the system can tolerate prior to such collapse. When the underlying collapse mechanism is due to a contingency, the performance index of this invention can measure its severity. The performance index of this invention can also assess whether the system can sustain a contingency without collapse.

18 Claims, 21 Drawing Sheets

$x_1(t)$ : trajectory associated with control vector $u_1$
$x_2(t)$ : trajectory associated with control vector $u_2$
$x_3(t)$ : trajectory associated with control vector $u_3$

METHOD FOR PREVENTING POWER COLLAPSE IN ELECTRIC POWER SYSTEMS

FIELD OF THE INVENTION

The present invention pertains to a method of protecting electrical generating power systems and, more particularly, to a method of preventing the voltage collapse of electrical generating power systems that are subject to heavy load or contingency conditions.

BACKGROUND OF THE INVENTION

Power blackouts occur around the world with more frequency as the demand for additional power continues to increase throughout the industrial societies. As each geographic area develops a need for electricity, a new power plant or power distribution system must be constructed. Each power generating system is unique, because each comprises different grids of power-generating capacity that are strung together to meet the varying power requirements of a given populace and geographic region.

Generally speaking, the power-generating capacities of most systems throughout the world are not keeping pace with the demand. This situation requires corrective stopgap measures, such as the institution of "brownout" procedures during periods of peak power loads. Brownout procedures can entail the reduction of voltage, as well as the number of cycles being supplied each second. Such procedures can only be a temporary means to alleviate an increased power demand problem. Eventually the system will fail, unless the generating power capacity is increased. Enforcing such curtailments, however, is not an adequate answer to the power shortage problem. Certain equipment, such as sensitive electronic devices and computers, will not run properly under reduced voltage and/or reduced cycle conditions.

Aging power facilities are a critical problem. Many power plants are currently in need of repair and/or are seriously inefficient. Many power generation facilities (such as those producing nuclear power) are dangerously outmoded and must be taken off line. Therefore, many of the existent power-generating systems are actually shrinking in their capacity to supply power.

Due to economics and the sometimes inordinate amount of time inherent in planning, construction of new generating plants to increase power capacity is not always possible. Even if power-generating capacity could be enhanced, it has not been best determined just where in the system the added capacity would provide the most benefit. In other words, there is no present means for determining the so-called "weak areas" in each power-generating system. Despite stopgap measures and the addition of new generating capacity, many systems still fail prey to blackouts. Present-day blackouts result from the industry's inability to predict and correct for these weak areas.

Weak areas are defined as those parts of the grid of a power-generating system that cannot tolerate added load. For example, present-day calculations cannot provide answers as to whether a particular bus can withstand a given increase in load, or whether the system can withstand a simultaneous increase of load on one bus while sustaining an increase in demand on another bus in the grid.

Voltage collapse is generally caused by two types of system disturbances: load variations and contingencies. The voltage collapse in Japan in 1987 was due to load variations; the load collapse in Sweden in 1982 was due to a contingency. Blackouts usually develop in systems that are heavily loaded and which also experience additional power demand.

The present invention has developed a method for determining a performance index for each power-generating system that, for the first time, is directly correlated to load demand. This performance index can be easily interpreted by power engineers and operators, so that weak areas and potential voltage collapse conditions can be predicted and corrected.

When the underlying cause of collapse is due to load variations, the performance index of the current invention has the ability to measure the amount of load increase that the system can tolerate prior to such collapse.

When the underlying collapse mechanism is due to a contingency, the performance index of this invention can measure its severity. The performance index of this invention can also assess whether the system can sustain a contingency without collapse.

The method of this invention uses the new performance index to provide a means by which load-shedding techniques can be optimized to prevent system collapse.

The method of voltage collapse prevention of the invention comprises the following general steps:

a) measuring the load demands in the power-generating system;

b) calculating a voltage collapse index (VCI) directly correlated to the load demands of the power-generating system of step (a);

c) utilizing the VCI to identify weak areas in the grid of the power-generating system;

d) determining actual safety margins that exist for these weak areas before collapse will occur; and e) shedding power in those portions of the grid that are identified as weak areas, in order to prevent voltage collapse in the power-generating system, in accordance with said safety margins.

The aforementioned method also contemplates, as an alternative to step "e", the step of adding power-generating capacity to weak areas, in order to increase the safety margin, and thus prevent voltage collapse during heavy load conditions.

Previous prediction indices could not determine where to shed load in the system. Neither could they determine or measure the load-sustaining capacities of the weak areas. Nor could they be used to pinpoint the underlying mechanisms of voltage collapse. In other words, such indices were developed in the "state space", not in the "parameter space". They were not directly correlated to load demands.

The invention reflects the observation that saddle-node bifurcations, which occur in physical applications such as power generation, form critical points, loading limits, extremes of parameter variation and points of loss of stability. In prior mathematical determinations of criticality, the singularity of the system Jacobian matrices at bifurcation points were usually determined by using continuation methods, as well as an extended characteristic equation of dimension 2n+1 for n-dimensional systems. The invention presents a mathematical method for a quick procedure that eliminates the convergence problems associated with the singularity of the Jacobian.

Thereafter, the invention defines: "decoupled, parameter-dependent, non-linear (DPDN) dynamic systems as ones whose dynamics can be represented by a set of non-linear equations with a varying parameter that can be decoupled from the remainder of the equation".

The invention further restricts the procedure to linear parameter-dependence.

The present invention first solves the convergence problem at or near the saddle-node bifurcation points (SNBP), and then estimates the location of these points in order to compute the exact SNBPs.

In order to perform the exact computation, however, the invention has developed a new method that reduces the computational burden of dealing with a (2n+1)-dimensional system of equations. The invention expresses a new characteristic equation defining the exact saddle-node bifurcation point, and has a dimension of only "n+1". In addition, the invention derives a criterion that allows for the bracketing of the solution in advance, in order to guarantee convergence. Such assurance has usually been impossible when using standard (2n+1)-dimensional, non-linear equations.

SUMMARY OF THE INVENTION

In accordance with the present invention, there is provided a method of preventing voltage collapse in a power-generating system. The method comprises the following steps:

a) measuring the load demands in the power-generating system;

b) calculating a voltage collapse index (VCI) directly correlated to the load demands of the power-generating system of step (a);

c) utilizing the VCI to identify weak areas in the power-generating system;

d) determining actual safety margins that exist for these weak areas before collapse will occur; and e) shedding power in those portions of the power-generating system that are identified as weak areas, in order to prevent voltage collapse in the power-generating system, in accordance with said safety margins.

The aforementioned method also contemplates, as an alternative to step "e", the step of adding power-generating capacity to weak areas, in order to prevent voltage collapse during heavy load conditions.

In calculating the Voltage Collapse Index, the invention provides a technique having the following advantageous features:

1) It locally removes the singularity of the corresponding Jacobian.

2) It requires only a simple modification of the original non-linear equations, with no added dimension.

3) It adds just a few non-zero elements to the Jacobian matrix of large sparse systems.

4) It enlarges the region of convergence around singular solutions.

5) It leads to a new characteristic equation that defines the saddle-node bifurcation point by adding just one equation to the original set of non-linear equations.

The invention answers questions about the performance of a system that prior techniques could not answer, such as: "Can the system withstand a simultaneous increase of 70 MW on bus 2 and 50 Mvars on bus 6?"

The invention also establishes a direct relationship between its Voltage Collapse Index and the load demands. Such a relationship makes practical the assessment of the status of the grid system by operators, thereby allowing them to easily avoid a potential voltage collapse.

Thus, as part of the calculation of VCI in step (b), the invention additionally calculates the exact point of voltage collapse (PVC).

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention reflects the observation that saddle-node bifurcations which occur in physical applications such as power-generation, form critical points, loading limits, extremums of parameter variation and points of loss of stability. In prior mathematical determinations of criticality, the singularity of the system Jacobian matrices at bifurcation points was usually determined by using continuation methods, and an extended characteristic equation of dimension 2n+1 for n-dimensional systems. The invention presents a mathematical method for a quick procedure that eliminates the convergence problems associated with the singularity of the Jacobian.

Thereafter, the invention defines: "decoupled, parameter-dependent, non-linear (DPDN) dynamic systems as ones whose dynamics can be represented by a set of non-linear equations with a varying parameter that can be decoupled from the remainder of the equation".

The invention further restricts the procedure to linear parameter-dependence.

The present invention first solves the convergence problem at or near the saddle-node bifurcation points (SNBP), and then estimates the location of these points in order to compute the exact SNBPs.

In order to perform the exact computation, however, the invention has developed a new method that reduces the computational burden of dealing with a (2n+1)-dimensional system of equations. The invention expresses a new characteristic equation defining the exact saddle-node bifurcation point, and has a dimension of only "n+1". In addition, the invention derives a criterion that allows for the bracketing of the solution in advance, in order to guarantee convergence. Such assurance has usually been impossible when using standard (2n+1)-dimensional non-linear equations. The method of the invention is generally shown by the block diagram flow chart 100, illustrated in FIG. 30. The method first measures the load demands of a power generating system, step 101. After calculating a voltage collapse index (VCI) related directly to load demands of the system, step 102, the method identifies weak areas of the system, step 103. The VCI calculation also determines the exact point of voltage collapse, step 109. Actual safety margins that exist for the weak areas are determined, step 104, and then remedial action can be taken, step 105, either by shedding power generating capacity in the weak areas of the system, or by adding extra generating capacity to those weak areas. The method of the invention will be explained in more detail with reference to the remaining FIGS. 1 through 29.

Figure 1:
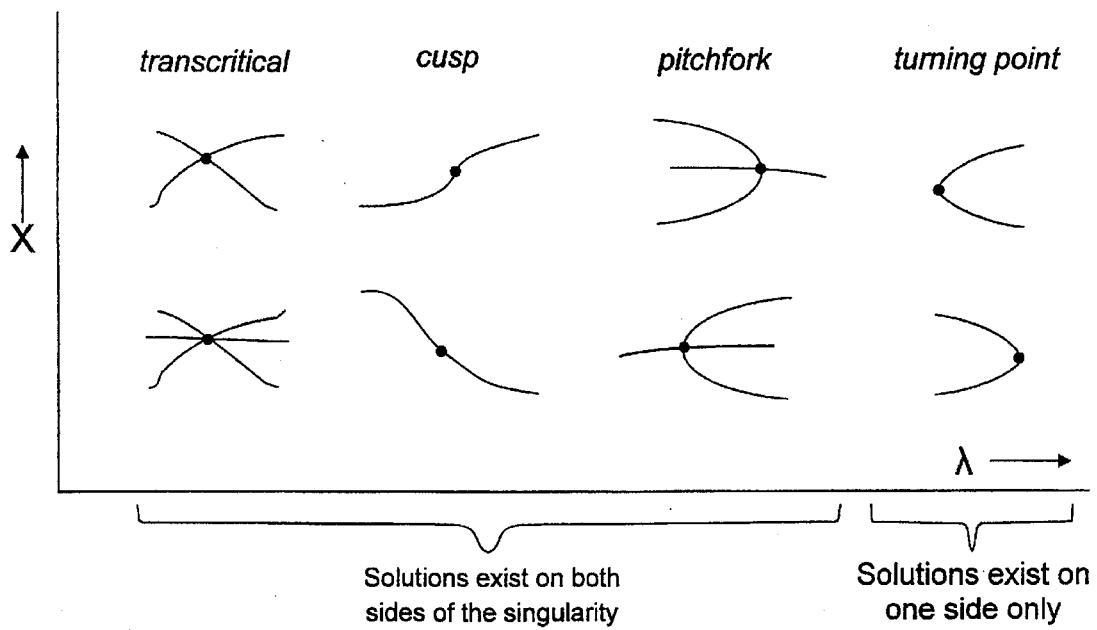
FIG. 1 illustrates a variety of graphically expressed bifurcation points at which the Jacobian is singular.

Now referring to FIG. 1, consider the general class of problems requiring the solution of a set of parameterized non-linear equations:

$$f(\chi,\lambda)=0 \quad (1)$$

Given the set of equilibria of a system defined by a parameterized system of equations, bifurcation points are "critical" points at which the qualitative nature or the multiplicity of the equilibria changes suddenly. Turning or limit points have multiple solutions on one side but no solutions on the other side as the parameter set changes. Algebraically, these are points at which the Jacobian $f_\chi(\chi,\lambda)$ of equation (1) is singular, i.e., where $\det(f_\chi(\chi,\lambda))=0$. Solution points are called regular points, otherwise. A formal definition of regular and singular points is given hereinafter.

The inventive method is constrained to those bifurcation points at which the Jacobian has areai one-dimensional null space. These points are referred to as saddle-node bifurcation points. They are believed to occur quite frequently in actual applications. Consider points $(\chi^*, \lambda^*)$ for which: $\text{rank}(f_\chi(\chi,\lambda))=n-1$. This fact clearly points out that the ill-conditioning which may be encountered while solving (1) must occur near such points.

A new family of functions is defined. Let $\mathcal{G}$ be the set of functions $\Gamma(\chi,\lambda,\kappa)$ which has the following properties:

(P1) $\Gamma: R^n \times R^m \times R^m \to R^n$, $\Gamma(\chi,\lambda,\kappa)=f(\chi,\lambda)+h(\chi,\lambda,\kappa)$, where $\kappa \in R^m$; $f(\chi,\lambda)$ as defined at the beginning of section 2; and h: $R^n \times R^m \times R^m \to R^n$ is $C^2$.

(P2) $\text{range}(h_\chi(\chi,\lambda,\kappa)) \oplus \text{range}(f_\chi(\chi,\lambda))=R^n$ for at least one point $(\tilde{\chi},\tilde{\lambda},\tilde{\kappa})$.

The family $\Gamma$ can be used to locally remove simple bifurcation points, i.e., to transform a bifurcation point into a regular point. This will be shown using the following theorems.

Proposition 1: $\Gamma_\chi(\chi,\lambda,\kappa)$ has full rank in an open neighborhood of $(\tilde{\chi},\tilde{\lambda},\tilde{\kappa})$.

This proposition is of particular interest if $(\tilde{\chi},\tilde{\lambda},\tilde{\kappa})=(\chi^*,\lambda^{*'}, *)$, when $(\chi^*,\lambda^*)$ is a bifurcation point of (1) for some chosen $\kappa^*$. The importance of this assertion becomes more evident when associated with the following.

Theorem 1: The solutions of $\Gamma(\chi,\lambda,\kappa)=0$ belong to the manifold defined by $$h(\chi,\lambda,\kappa)=0 \quad (2)$$

iff they are solutions of (1).

Figure 2A:
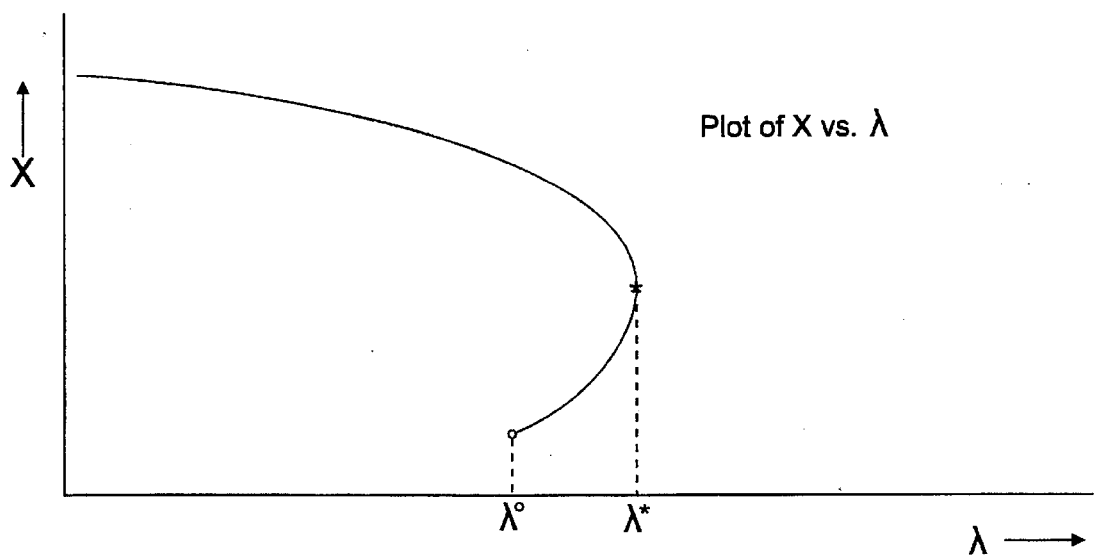
FIGS. 2a and 2b depict two graphs illustrating the effect of the change of parameter on the bifurcation points.
Figure 2B:
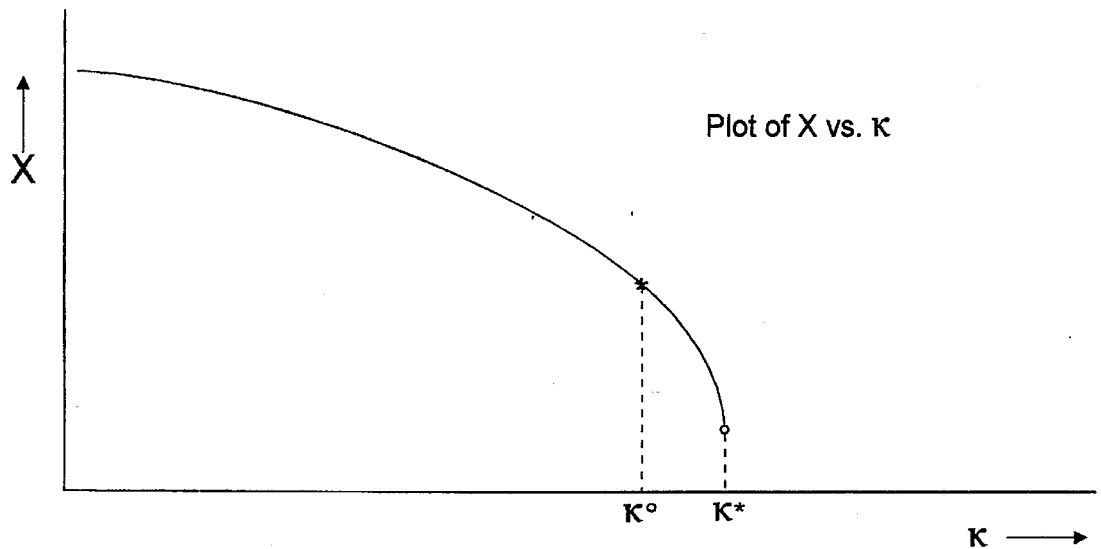

Theorem 1 implies that the addition or change of parameter from $\lambda$ to $\kappa$, implicitly defined by (2), preserves the solution space of (1). In conjunction with Proposition 1, this theorem shows that the bifurcation point can be moved away from a point of interest. FIGS. 2a and 2b illustrate this situation in one-dimensional state and parameter spaces. The value $\lambda^*$ is the parameter value at bifurcation for the original system (FIG. 2a); for the sake of comparison, locate its relative position $\kappa^*$ considered for the modified system and given by $h(\chi^*,\lambda^*,\kappa^*)=0$ (where $\chi^*$ is the bifurcation point in the state space of the original system). When the modified form $\Gamma$ is used, $\kappa^0$ is the bifurcation value (FIG. 2b). Its position relative to $\lambda^*$ of the original system is given by $\lambda^0$ which is defined by $h(\chi^0,\lambda^0,\kappa^0)=0$ ($\chi^0$ is the bifurcation point in the state space of the modified system). When the form $\Gamma$ is used, $\kappa^0$ (FIG. 2b) is the bifurcation value-$\kappa^*$, the equivalent of the bifurcation value in the normal case, becomes a regular solution point. The set of equations to be considered near singular points can thus be taken to be the extended system:

$$\Gamma(\chi, \lambda, \kappa)=0$$
$$h(\chi,\lambda,\kappa)=0. \quad (3)$$

Consider now a sub-class of functions $f$ defined by (1) and which depends only linearly on a parameter and for which the parameter-related terms can be decoupled from the rest of the nonlinear equations. In this case, $f(\chi,\mu)=\phi(\chi)-L\mu$, $L\in \Re^{n\times m}$. For ease of notation, we will write $\phi(\chi)=f(\chi)$. Then we simply have: $f(\chi,\mu)=f(\chi)-L\mu$. In actual applications, $f(\chi)$ defines the system dynamics ($\dot\chi=f(\chi)$) and $L\mu$ some parameter variation following some designated pattern $\mu=\mu(\lambda)$. For small parameter increments or a slowly varying parameter, the variation is such that $\mu(\lambda)$ can be linearized locally so that $\mu(\lambda)=a\lambda, a\in \Re^m$ and $f(\chi,\lambda)=f(\chi)-b\lambda$, with $b=La$.

The equilibrium set of such systems is the set of solutions of $$f(\chi)-b\lambda=0, \qquad (4)$$

where $\lambda\in \Re^1$, $b\in \Re^n$ and $f: \Re^n \to \Re^n$ for an n-dimensional system.

Pursue the study in detail for saddle-node bifurcation points. The motivation for scrutinizing the restricted case of saddle-node bifurcation points is multiple. First, it is easier to compute solutions in the vicinity of some bifurcation points other than saddle-node bifurcation points (i.e., transcritical or pitchfork bifurcations) where solutions exist on either side of the singularity (FIG. 1). Second, the equilibrium set of numerous dynamical systems are known to be "nose curves" or "knee curves" exhibiting saddle-node bifurcation points.

Figure 3A:
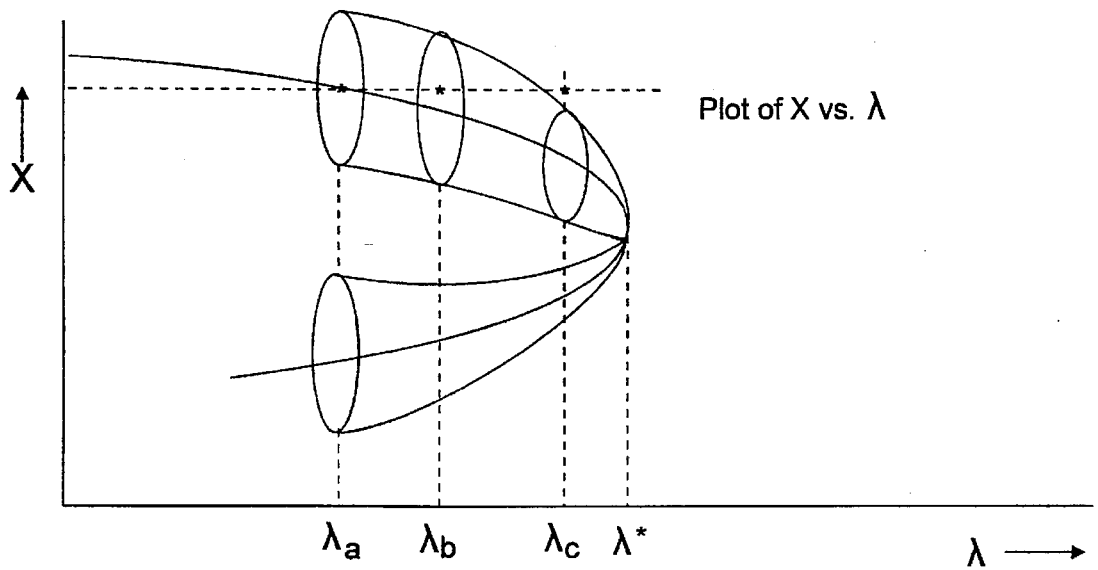
FIGS. 3a and 3b show in graphic form the appearance of convergence cones as they depend upon parameterization.

Now, suppose that an attempt is made to find solutions $x_b$ and $x_c$ of system (4) for parameter values $\lambda_b$ and $\lambda_c$, respectively, from a previously known solution $(\chi_a,\lambda_a)$. It has been shown how initial guesses must lie inside "convergence cones" in order for a solver to converge to a solution near singularities. FIG. 3a illustrates this situation. Since $(X_a,\lambda_b)$ lies inside the section of the convergence cone for $\lambda=\lambda_b$, the solver will converge to the solution $(\chi_b,\lambda_b)$ from the initial value $(\chi_a,\lambda_b)$. However, $x_a$ is "too far" for convergence to be attained for $\lambda=\lambda_c$: the initial guess $(\chi_a,\lambda_c)$ lies outside the convergence cone and the solver iterations will diverge.

Figure 3B:
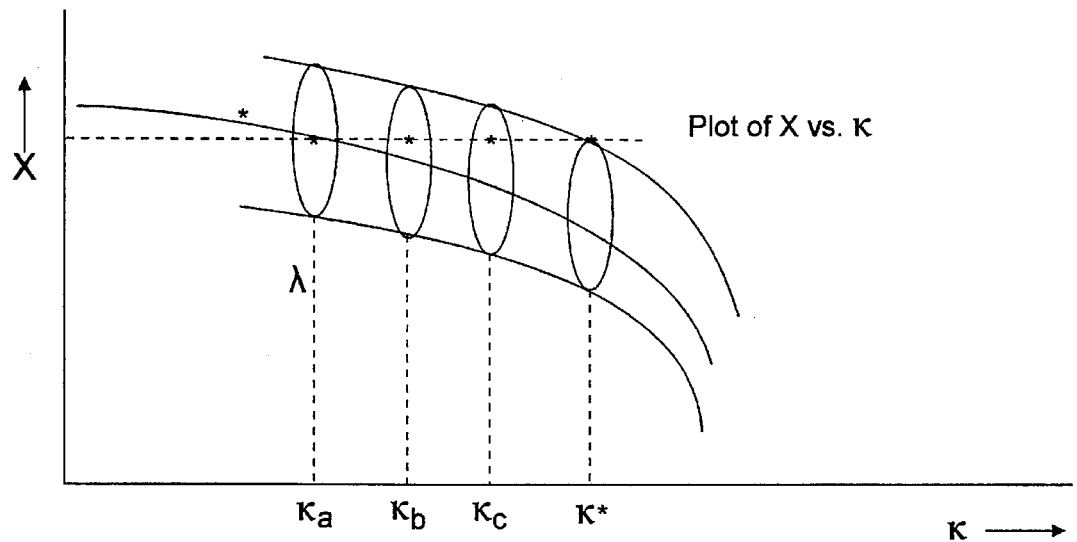
Figure 4:
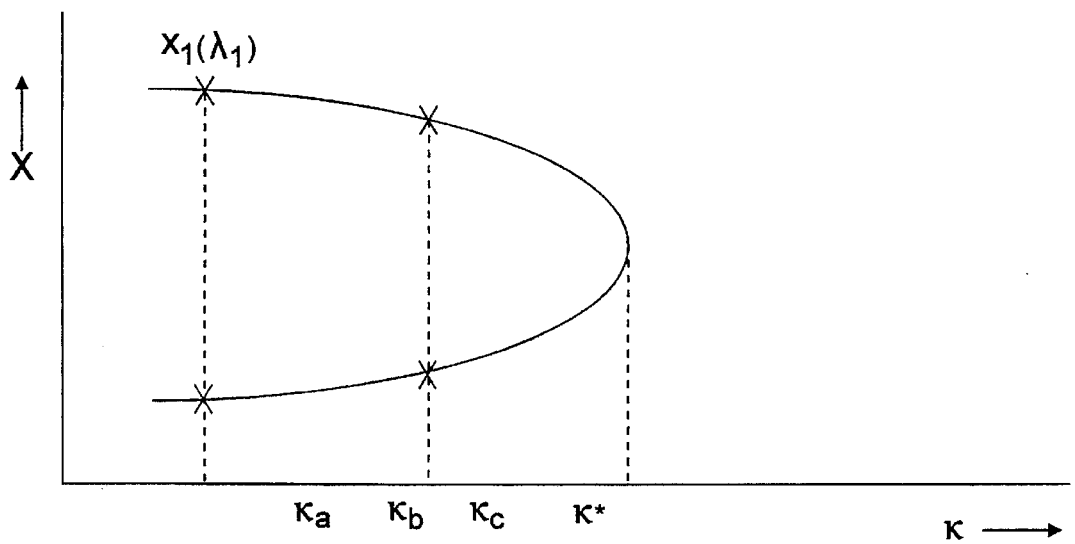
FIG. 4 depicts a graph of a saddle-node bifurcation point having a load-flow solution.
Figure 5A:
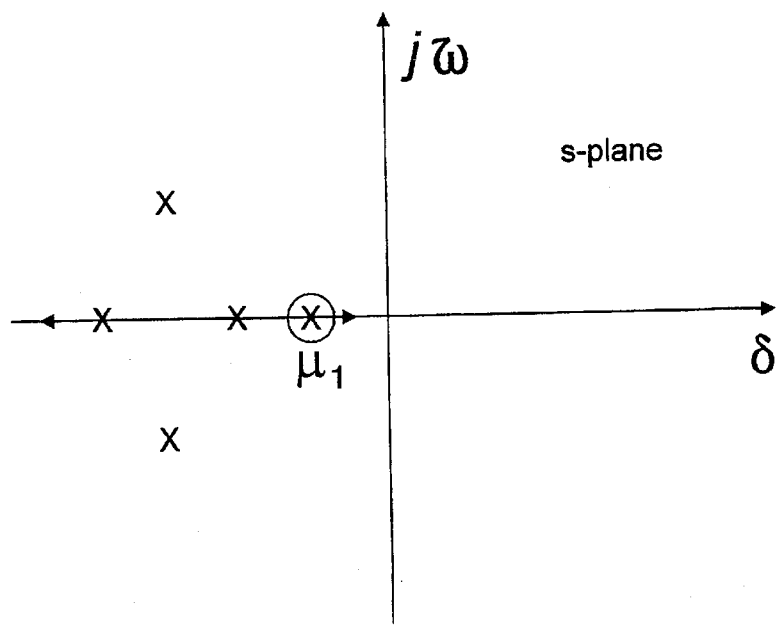
FIGS. 5a and 5b illustrate graphs of eigenvalue locations for $D_\chi f(\chi_1,\lambda)$ and $D_\chi f(\chi_2,\lambda)$ before the bifurcation point.
Figure 5B:
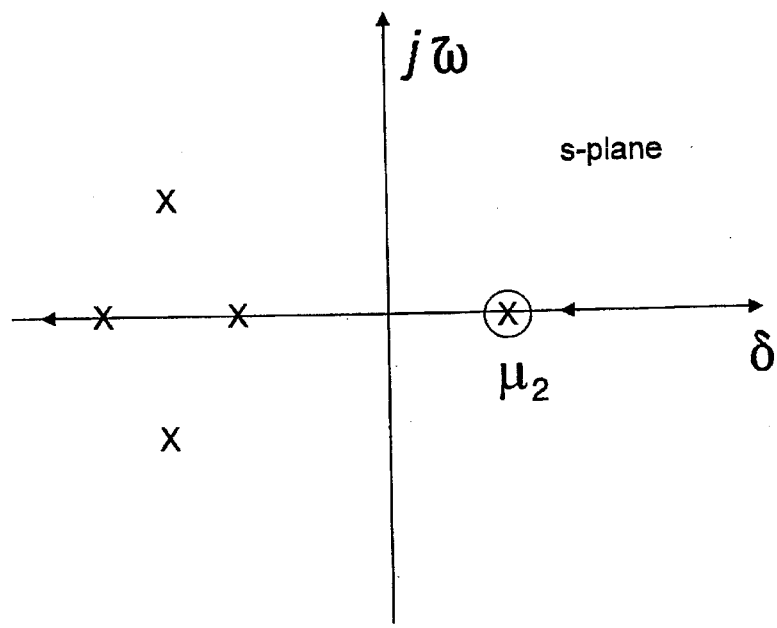
Figure 6:
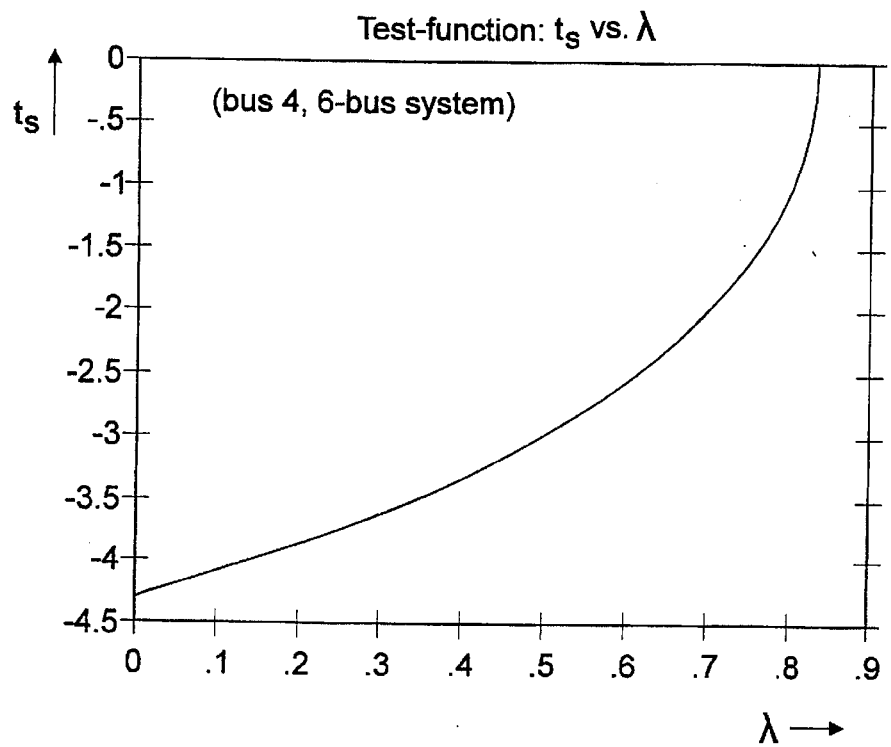
FIG. 6 shows a graph for the test function $t_s$ obtained for a 6-bus network with respect to a load increase on bus-3.
Figure 7:
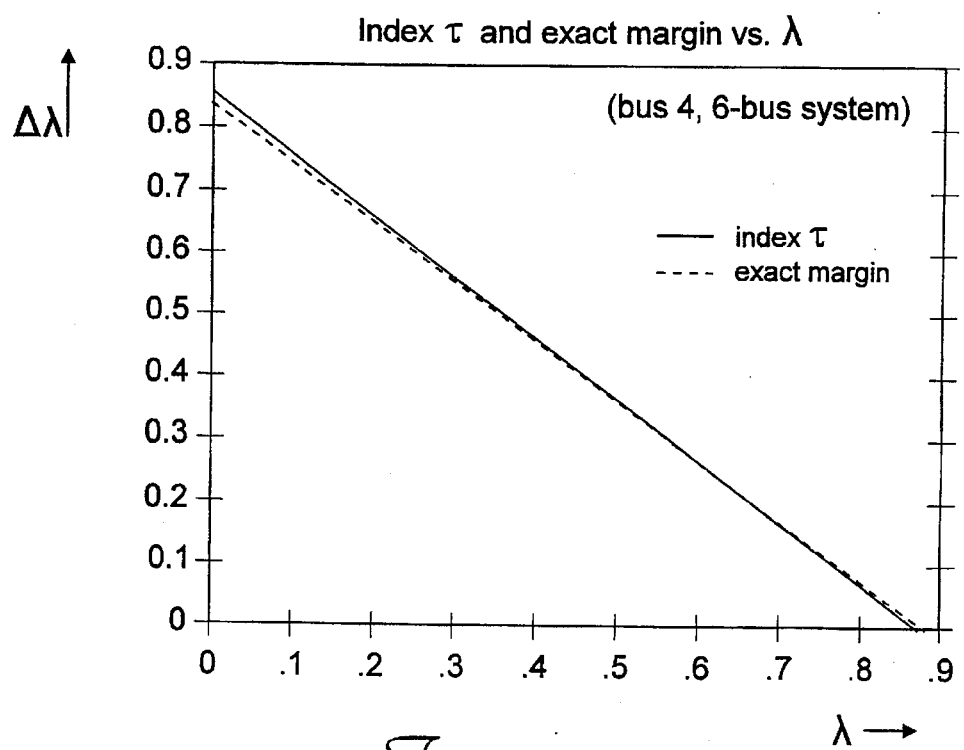
FIG. 7 depicts a graph of the estimated bifurcation value compared to the exact value $\lambda^*$ in a test case.

By locally removing the singularity as previously suggested, hereinafter a much bigger convergence cone region is created—for the Newton Method, for example—in its 5 vicinity. In this case, convergence is more likely to be attained from $(\chi_a,\kappa_a)$ to $(\chi_b,\kappa_c)$, $(\chi_c,\kappa_c)$ and even $(\chi^*,\kappa^*)$ (FIG. 3b).

Given this situation, next is offered a practical choice for the form of the extended equations (3) for removing the singularity, along with a theoretical justification for this choice.

A function h is chosen which allows us to take full advantage of the decoupled structure of equation (4). A mathematical formulation is then presented which allows us to offer a theoretical analysis of the case.

One simple choice for the function h(., ., . ) from the previously stated definition of $\Gamma$ is:

$$h(\chi,\lambda,\kappa)=(\lambda-\kappa b^T\chi)b, \qquad (5)$$

with $b^T x \neq 0$, where superscript T indicates transposition. Let the scalar function k(., ., . ) represent the multiplicative term of b in (5):

$$\kappa: \Re^n\times\Re^2 \to \Re; \kappa(\chi, \lambda, \kappa)=\lambda-\kappa b^T x. \qquad (6)$$

As a result, from the family $\Gamma$ we obtain the function g:

$$g(\chi,\lambda,\kappa)=f(\chi)-\kappa b^T x b. \qquad (7)$$

The function g is arrived at by computing $\lambda(\chi,\kappa)$ from the constraint $\kappa(\chi,\lambda,\kappa)=0$ and replacing it in (4). The importance of the choice of form of equation 5 is twofold. First, the solutions of (7) constrained to $h(\chi,\lambda,\kappa)=0$ are the same as those of (4) by theorem 1. Secondly, now reduce the augmenting equation of (3) to a scalar equation (6). Consequently, with the resulting modified form only depending on $\kappa$, one can satisfy the needed constraints without increasing the dimensions of the original system. Further, this new function's Jacobian matrix is non-singular at most solution points of (4) and, in particular, at its turning points. Why this is true is shown hereinafter.

First, recalling definition 1:

Definition 1 (i) A solution $(\chi_1,\lambda_1)$ of (1.4) is a regular solution point if $f_\chi|_1$ is nonsingular. (ii) A solution $(\chi^*,\lambda^*)$ of (1.4) is a normal turning point if (a) dim null $(f_\chi|_*)=1$ and (b) $f_\lambda|_* \notin \text{range}(f_\chi|_*)$, where the notations "$|_1$" and "$|*$" mean evaluated at $(\chi_1,\lambda_1)$ and $(\chi^*,\lambda^*)$ respectively.

The following lemma highlights the characteristic property of a normal turning point.

Given any parameter $s \in \Re$—where in physical systems, s could be an increase in some input value—write $$\dot u* = \frac{du(s)}{ds}\bigg|_{s=s^*}.$$

Lemma 1 For any parameterization $(\chi(s),\lambda(s))$ of the solutions $(\chi,\lambda)$ of (1.4), if$(\chi^*,\lambda^*)=(\chi(s^*),\lambda(s^*))$ is a normal turning point, then $\dot\lambda=0$.

This is a known result and follows from definition 1 above. The saddle-node bifurcation points frequently encountered in dynamical systems problems are turning points of this type.

Next, consider equation (7) in its form of extended system (3):

$$f(\chi,\lambda)=0$$
$$\kappa(\chi,\lambda,\kappa)=0. \qquad (8)$$

Defining, $z=[x,\lambda]$ and $o: \Re^{n+1}\times\Re \to \Re^{n+1}$:

$$F(z,k)=\begin{bmatrix} f(\chi,\lambda) \\ k(\chi,\lambda,\kappa) \end{bmatrix}, \qquad (9)$$

(8) can be written $$F(z,\kappa)=0 \qquad (10)$$

Then the new system Jacobian matrix is:

$$F_z(z,k) = \begin{bmatrix} f_\chi(\chi,\lambda) & f_\lambda(\chi,\lambda) \\ k_\chi(\chi,\lambda,\kappa) & k_\lambda(\chi,\lambda,\kappa) \end{bmatrix} \qquad (11)$$

$$= \begin{bmatrix} A & B \\ C^\dagger & D \end{bmatrix},$$

("$\dagger$" denotes conjugate transpose).

Now, the theorems on which the proposed methodology are based will be stated.

Theorem 2 Regular points of (1.4) are regular solution points of (1.10) if and only if $$\frac{b^T\dot\chi}{b^T\chi} \neq \frac{\dot\lambda}{\lambda}.$$

Theorem 2 allows the use of equations (4) and (10) interchangeably to compute solutions for the given system. More importantly, it permits the use of (10) in the vicinity of the turning points, consisting of analytically regular solution points.

Theorem 3 Normal turning points of (1.4) are regular solution points of (1.10).

This theorem principally supports the proposed methodology. Further, note that the smoothness of $f$, along with the implicit function theorem, implies that, by continuity, there must exist an open neighborhood of $(\chi^*,\lambda^*)$, in which solutions of (4) are also regular points of (10). This property allows us to also utilize (10) to solve for solutions in the neighborhood of $(\chi^*,\lambda^*)$, thus avoiding convergence problems due to near-singularity.

For the general problem requiring the solution of a set of parameterized non-linear equations, one must:

1) exploit the particular structure of the given function $f(\chi,\lambda)$, in order to define an appropriate $h(\chi,\lambda,\kappa)$ which has the properties stated hereinafter;

2) compute solutions far from singularities, using the original function $f(\chi,\lambda)$;

3) compute the solutions at or near the desired singularities by solving the constrained system (3). (Care must be taken to minimize the number of additional constraints introduced by h).

In general, defining $h(.,.,.)$ as suggested above could be hard, depending on the form of $f(\chi,\lambda)$. Therefore, next is offered a practical methodology in the specific case of normal limit points of DPDN equations depending linearly on a parameter $\lambda$.

Under the restrictions described hereinafter, a systematic approach is offered. In the present case $f(\chi,\lambda) = f(\chi) - b\lambda$, $b \in \mathfrak{R}^n$ and $\lambda \in \mathfrak{R}$. If the solution desired is near a known turning point or fails to converge quickly, use $g(\chi,\kappa)$ and $g_\chi(\chi,\kappa)$ to solve; otherwise, use $f(\chi,\kappa)$ and $f_\chi(\chi,\kappa)$. To utilize the modified form, proceed as follows.

Define a new parameter $\kappa$ such that $\lambda = \kappa b^T x$ (from (6) and (8));

2) Change the parameter $\lambda$ in $f(\chi,\lambda)$ using the above relation; this yields the new function $g(\chi,\kappa)$, as in (7), which has the same dimensions as $f(\chi,\lambda)$;

3) Compute the new Jacobian by adding a constant matrix to the existing one:

$$g_\chi(\chi,\kappa) = f_\chi(\chi,\kappa) - \kappa bb^T; \quad (12)$$

In practice, b is usually very sparse, so that $b^T$ does not significantly reduce the sparsity of $f_\chi(\chi)$: two non-zero elements are added for each pair $(b_i,b_j)$ with $b_i \neq 0 \neq b_j$.

Several recent power system blackouts were related to voltage collapse. This phenomenon is characterized by a slow variation in the system operating point in such a way that voltage magnitudes at load buses gradually decrease until a sharp, accelerated change occurs. Voltage collapse has been especially experienced by heavily loaded power systems that are subjected to an increase in load demands. There is a wide consensus that, as power systems operate under increasingly stressed conditions, the ability to maintain voltage stability to avoid collapse becomes a serious concern.

Among several examples of voltage collapse, the recent voltage collapse in Japan in 1987 was due to load variations; the voltage collapse in Sweden in 1982 was caused by a contingency. Voltage collapse due to contingencies has been studied by several researchers; the key issues have been the feasibility of the stable equilibrium point after contingency and the estimate of its stability region (region of attraction). Voltage collapse has also been attributed to a lack of reactive power support, which can be equivalently regarded as due to increases in load demand.

A number of performance indices intended to measure the severity of the voltage collapse problem have been proposed in the literature. One performance index proposed is based on the angular distance between the current stable equilibrium point and the closest unstable equilibrium point in a Euclidean sense. Another performance index proposed measures the energy distance between the current stable equilibrium point and the closest unstable equilibrium point, using an energy function. These performance indices can be viewed as providing some measure relative to the "distance" between the current operating point and the bifurcation point. However, all of these performance indices are defined in the state space of power system models. Thus, these performance indices are defined in the state space of power system models. Thus, these performance indices cannot answer questions such as "Can the system withstand a 100 MVar increase on bus 11?", or "Can the system withstand a simultaneous increase of 70 MW on bus 2 and 50 Mvars on bus 6?"

After over two decades of study of the occurrences of actual voltage collapses and consideration of numerous approaches, it is now generally accepted that voltage collapse can be the result of either dynamic instabilities or a static loss of stability. In the first case, the system is unable to control an unusual sequence of events—contingencies, tripping circuit breakers, operation of OLTCs, etc. This directs the system operating point along a trajectory which leads it out of its stability region. In the second case, the system continually operates near a stable equilibrium or operating point, but loses stability as the region of attraction locally disappears, typically under heavily loaded conditions. This is the class of problems considered here. It has been noted that, in addition to the preceding scenarios, the dynamic events may also create conditions under which the static problem appears. Therefore, static bifurcations are important enough that it is appropriate to develop the conceptual and computational means to analyze systems of realistic scale.

It should be stressed that one basic requirement for useful performance indices is their ability to reflect the degree of direct mechanism leading the underlying system toward an undesired stage. In the context of voltage collapse in power systems, it is expected that any performance index has the ability to:

1) measure the amount of load increase that the system can tolerate before collapse (when the underlying mechanism of collapse is due to load variations), or 2) assess whether the system can sustain a contingency without collapse (when the underlying mechanism of collapse is caused by a contingency) and measure the severity of the contingency.

The existing performance indices, however, generally do not exhibit any obvious relation between their value and the amount of the underlying mechanism that the system can tolerate before collapse. We assert that, in order to provide a direct relationship between its value and the amount of load increases that the system can withstand before collapse, the performance index must be developed in the parameter space (i.e., the space of load demands), rather than in the state space where the existing performance indices were developed.

This invention presents a new performance index that provides a direct relationship between its value and the amount of load variations that the system can withstand before "static" collapse. The new performance index has the following distinguishing features:

a) It is more practical than existing ones in terms of its ability to provide a direct relationship between its value and the amount of parameter variation that the system can withstand before collapse. More specifically, it is readily interpreted to operators of power systems who must answer questions such as "Can the system withstand a simultaneous increase of 70 MW, 40 Mvars on bus 2, 100 MW on bus 5 and 50 Mvars on bus 16?"

b) It provides useful information as to how to derive load-shedding schemes to avoid voltage collapse. The new performance index, as well as the voltage collapse margin presented herein, have been tested on several power systems. Simulation results on the IEEE 39-bus and the Tai-power 234-bus system are presented with promising results.

In general, a power system can be described by $$\dot{\chi} = f(\chi, \lambda) \quad (13)$$

where $x \in \Re^n$ is a state vector including bus voltage magnitudes and angles $\lambda \in \Re^m$ is a parameter vector representing real and reactive power demands at each load bus. The parameter vector $\lambda$ is subject to variation (due to load variations) causing a structure change in the load flow solutions of (14). For instance, the number of load flow solutions may change as $\lambda$ varies. If the parameter $\lambda$ varies slowly or quasi-statically with respect to the dynamics of (13), then the power system can be appropriately modeled by $$0 = f(\chi, \lambda). \quad (14)$$

Typically, the power system (14) operates at a stable load flow solution, say at $x_1^0$ with parameter $\lambda^0$, (the system Jacobian at $x_1$, $D_\chi f(\chi_1^0, \lambda^0)$, has eigenvalues only with negative real parts). For $\lambda$ sufficiently close to $\lambda^0$, the stable load flow solution $x_1^0$ persists and its stability type remains unchanged. It is when $D_\chi f(\chi_1^0, \lambda^0)$ has some eigenvalues on the imaginary axis that for $\lambda$ sufficiently close to $\lambda^0$, radical changes (bifurcations) in the structure of load flow solutions can occur. The stable operating point $x_1$ may disappear or become unstable, depending on the system structure and the way in which the parameter is varied.

Of interest is the situation when the system (14) is the so-called one-parameter dynamical system. In power system applications, a one-parameter dynamical system is a system together with one of the following conditions:

1) The reactive (or real) power demand at one load bus varies while the others remain fixed.
2) Both the real and reactive power demand at a load bus varies and their variations can be parameterized. Again, the others remain fixed.
3) The real and/or reactive power demand at some collection of load buses varies, and their variations can be parameterized while the others are fixed.

One typical way causing the stable operating point $x_1$ to disappear is that $x_1$ and another load flow solution $x_2$ coalesce and disappear in a saddle-node bifurcation as parameter $\lambda$ passes through a bifurcation value $\lambda^*$. Before the bifurcation, in a close neighborhood of the stable operating point $x_1$ in the state space, there is a unique load flow solution $x_2$ lying inside the neighborhood. $x_1$ and $x_2$ form a pair of load flow solutions. As parameter $\lambda$ varies toward its bifurcation value $\lambda^*$, this pair of load flow solutions gets closer to each other and finally, $x_1$ and $x_2$ coalesce, when $\lambda = \lambda^*$, to form an equilibrium point $\chi^*$ whose corresponding system Jacobian has one zero eigenvalue and the real parts of other eigenvalues are negative. Furthermore, there are no load flow solutions nearby. In the terminology of nonlinear dynamical systems, $\lambda^*$ is called the bifurcation value and $(\chi^*, \lambda^*)$ called the bifurcation point.

The center manifold voltage collapse model was based on the saddle-node bifurcation and its consequent dynamics. It has been shown that the model encompasses many existing models used to explain voltage collapse, such as the multiple load flow model, the load flow feasibility model, the static bifurcation model, the singular Jacobian model and the system sensitivity model.

Given a system of nonlinear equations dependent on the parameter $\lambda$ defined by equation (1), in order to compute the bifurcation value and the state variables at the bifurcation point, a practical means of approximating the bifurcation value for the parameter is needed.

In order to do this, refer to equation (1). Let $$J_{lk} \triangleq G(I - e_l e_l^T)J + e_l e_k^T, \quad (15)$$

where $$J = \frac{\partial f}{\partial \chi} \bigg|_{\chi = \chi_1},$$

I is the identity matrix; $e_i$ denotes the $i^{th}$ unit vector; and the indices l and k are chosen such that $J_{lk}$ is nonsingular. The matrix $J_{lk}$ essentially consists of J, except that the l-th row is replaced by $e_k$. Next, consider the system of equations:

$$J_{lk}(\chi, \lambda) v = e_l \quad (16)$$

where $v \in \Re^n$, and $e_l$ is the lth unit vector. Let $\bar{v}$ be the solution of equation (16) at some known equilibrium point (EP) $(\chi, \lambda) = (\chi_1, \lambda_1)$. Choose as the test-function the value of the equation removed from $$J(\chi, \lambda) v = 0$$

$$e_k^T v = 1, \quad (17)$$

(which is generically an overdetermined system) to obtain equation (16).

Consider the following test-function $$t_s(\chi, \lambda) \triangleq e_l^T J(\chi, \lambda) v \quad (18)$$

This test function (FIG. 4) has the following desired characteristics: (a) it is a function of x and $\lambda$ and (b) it has a value of zero at the bifurcation value $\lambda^*$ of (4). The derivative of (18) is thus:

$$t'_s e_l^T (J'v + Jv') \quad (19)$$

Now, the difficulty is to compute the value $\lambda^*$, such that the value of test function $t_s(\chi^*, \lambda^*)$ equals zero (at the saddle-node bifurcation point), provided that an operating point $(\chi_1, \lambda_1)$ is given. One way to solve this difficulty is using the test-function value and its derivative at $(\chi_1, \lambda_1)$. This is explained in the following.

The above test-function (18) is expected to be, but is not restricted to, a parabolic function symmetrical about the $\lambda$-axis. To evaluate this, computer simulations have been run on several systems using a tool based on a continuation method to find the exact bifurcation value. These simulation results suggest that:

1) the test-function can be approximately quadratic when the parameter variations only affect one equation (as with a scalar parameter present in a single equation); and
2) the test-function can be best fit by a quartic model when the variations affect several equations (as with a parameter vector or a scalar parameter present in several equations).

This leads, after some algebraic manipulations, to the following expressions for the value $\lambda^*$:

$$\lambda^* \approx \lambda_1 - \frac{1}{2} \frac{t_s(\chi_1,\lambda_1)}{t'_s(\chi_1,\lambda_1)} \quad (20)$$

for the quadratic model, and $$\lambda^* \approx \lambda_1 - \frac{1}{4} \frac{t_s(\chi_1,\lambda_1)}{t'_s(\chi_1,\lambda_1)} \quad (21)$$

for the quartic model.

In practice, in order to avoid the large amount of computation needed to evaluate $t'_s$ exactly, an approximation of $t'_s$ can be found via the finite difference as:

$$t'_s \approx \bar{t}'_s = \frac{t_s(\chi(\lambda+\delta\lambda),\lambda+\delta\lambda) - t_s(\chi,\lambda)}{\delta\lambda}, \quad (22)$$

for small $\delta\lambda$. Perhaps using x as initial guess, an EP $x(\lambda+\delta\lambda)$ is computed. From this, in conjunction with equation (20) or (21), an estimate is obtained of the bifurcation value $\lambda^*$. Let $\bar{\lambda}$ denote this estimate:

$$\bar{\lambda} = \lambda_1 - \frac{1}{c} \frac{t_s(\chi_1,\lambda_1)}{\bar{t}'_s(\chi_1,\lambda_1)}, \quad (23)$$

where c=2 or 4 for the quadratic or quartic models, respectively.

The computation required in the above procedure basically involves calculations of two EP solutions (the current one and a new one) and some matrix computations. This makes the proposed approximation much easier and cheaper to compute than running continuation methods or utilizing some other technique proposed in the literature which requires calculations such as eigenvalues, eigenvectors, singular values, energy functions or conditional numbers. In addition, the proposed approximation provides a-direct measure regarding the amount of parameter increase that the system can withstand before reaching the saddle-node bifurcation point. This information could be valuable, as it is quickly available (as a by-product) before the computation of the exact saddle-node bifurcation value takes place. This is especially relevant in the case of very large systems.

Exact Safety Marqin Computations in DPDN Systems

The results are used of the reparameterization described previously and the particular structure of decoupled parameter-dependent equations to compute the exact saddle-node bifurcation point. This knowledge complements the estimated information by yielding an accurate margin to bifurcation. The proposed estimate and exact SNBP computation present the distinct advantage of reduced computation. The exact SNBP is computed using a novel (n+1)-dimensional characteristic equation instead of the generic (2n+1)-dimensional one generally offered in the literature. The computation involved in the proposed exact point determination is inexpensive in comparison with those required in the existing ones. A new scalar test function for the determination of SNBPs is utilized to compute the sought-after bifurcation point.

Given some real-valued scalar parabolic function $y(\alpha)$, $y: \mathfrak{R} \to \mathfrak{R}$, and the following information on a point in its domain:

i) the coordinates of some point $(y_1,\alpha_1)$, where $y_1=y(\alpha_1)$;

ii) the derivative $$y'_1 = \frac{dy}{d\alpha}\bigg|_{\alpha=\alpha_1}$$

at $(y_1,\alpha_1)$;

iii)

$$\bar{\alpha} \text{ s.t. } \frac{d\alpha}{dy}\bigg|_{\alpha=\alpha_1} = 0,$$

then the corresponding $\bar{y}=y(\bar{\alpha})$ can be computed using the following equation $$\bar{y} = y_1 + 2(\alpha_1 - \bar{\alpha}) \cdot y'_1. \quad (24)$$

Figure 8:
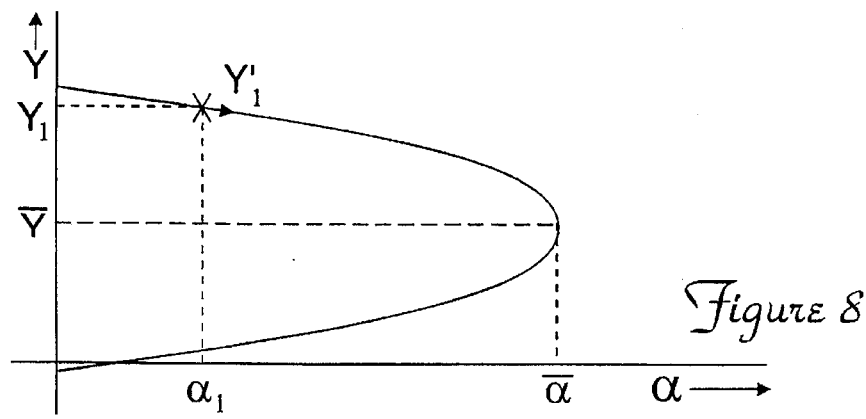
FIG. 8 illustrates a graph of an extremum of a parabolic function.

This is schematically represented in FIG. 8 Let $$\chi'_1 = \frac{d\chi(\lambda)}{d\lambda}\bigg|_{\chi=\chi_1}.$$

It is easy to show that:

$$\frac{d\chi(\lambda)}{d\lambda} = -f_\chi(\chi,\lambda)^{-1} \cdot f_\lambda(\chi,\lambda) \quad (25)$$

where $$f_\chi(\chi,\lambda) = \frac{\partial f(\chi,\lambda)}{\partial \chi} \text{ and } f_\lambda(\chi,\lambda) = \frac{\partial f(\chi,\lambda)}{\partial \lambda}.$$

It follows then from (24), (25) and given the result of equation (23), that assuming a quadratic form for $x_i(\lambda)$ of each component i of the state vector x, we can approximate the bifurcation value in the state space with x such that:

$$\bar{x}_i = x_{1i} + 2(\lambda_1 - \bar{\lambda}) \cdot x'_{1i}. \quad (26)$$

Figure 9A:
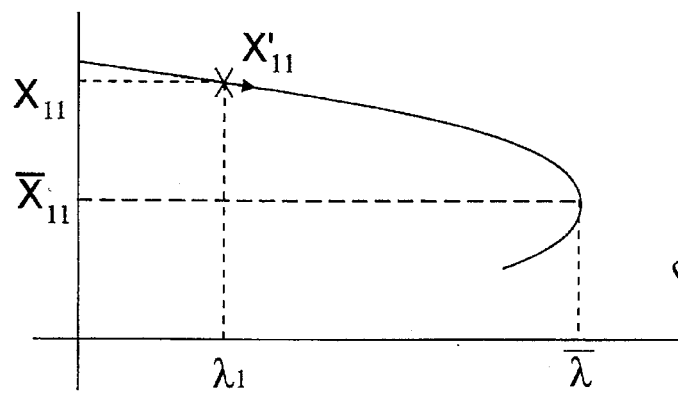
FIGS. 9a, 9b and 9c show graphs of the approximation of x of the bifurcation point x*.
Figure 9B:
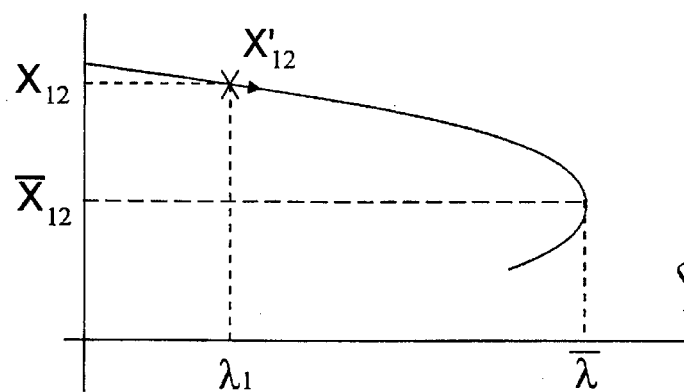
Figure 9C:
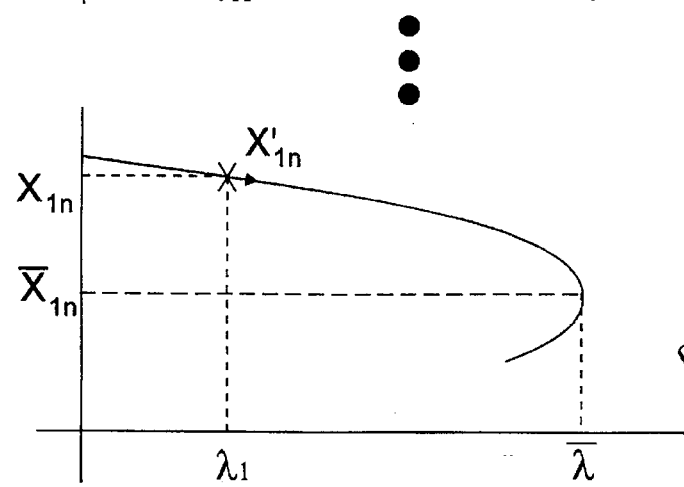

See FIGS. 9a, 9b, ..., 9n. A similar expression is obtained for a quartic form.

As a by-product of the computation of the approximate derivative $\bar{t}'$, equation (22), we already have $x(\lambda+\delta\lambda)$. Therefore, instead of computing the exact derivative vector $x'_1$ via (25), it is much more efficient to compute the secant approximation:

$$\chi'_1 \approx \frac{\chi_1(\lambda+\delta\lambda) - \chi_1(\chi,\lambda)}{\delta\lambda}. \quad (27)$$

This can in turn be used to compute $\bar{x}$ with (26). Generally, far from the saddle-node bifurcation value of (1), the approximation $\bar{x}$ is not a good enough estimate of the bifurcation point $\chi^*$. However, it does provide us with an approximate state vector with which to accomplish the change of parameter previously prescribed. This yields a new parameter value $$\bar{\kappa} = \frac{\bar{\lambda}}{b^T \bar{\chi}}. \quad (28)$$

which is to be used as an initial guess in solving for the exact bifurcation value $\lambda^*$, as demonstrated hereinafter.

When attempting to compute the (exact) bifurcation point $\chi^*$ associated with $\lambda$ for a nonlinear system with equilibria defined by (1), it is well known that the following extended system can be solved:

$$\begin{bmatrix} f(\chi,\lambda) \\ f_\chi(\chi,\lambda)v \\ v^T v - 1 \end{bmatrix} = 0, \quad (29)$$

where $v \in \Re^n$ is an auxiliary vector. However, this means attempting to solve a nonlinear system of equations twice as big as the original. The particular form of the DPDN equations and the defining equation for the change of parameters to design a scalar characteristic equation for the saddle-node bifurcation point is used. In association with the original equilibrium equations, we will then only need to solve an (n+1)-dimensional system of equations.

From (2) and (5), we see that the parameters $\lambda$ and $\kappa$ are related by the equation:

$$\lambda - \kappa b^T x = 0. \quad (30)$$

Let $$\left.\frac{d\chi}{d\kappa}\right|_*$$

denote the derivative $$\left.\frac{d\chi}{d\kappa}\right|_{(\chi,\lambda)=(\chi^*,\lambda^*)}.$$

The following lemma can be stated:

Lemma 3 If an EP $(\chi^*,\lambda^*)$ is a normal turning point of (1.1), then $$\left.\kappa\frac{d\chi}{d\kappa}\right|_* + \chi^* = 0$$

The proof of this lemma follows from Lemma 1 obtained by derivation of equation (30).

Furthermore, solutions of (4) can equivalently be obtained by solving:

$$g(\chi,\kappa) = f(\chi) - \kappa b^T x b = 0. \quad (31)$$

Let $c \in \Re^n$ be the solution of the linear equation $g_\chi(\chi,\kappa)c = b$; so that $c^* = [g_\chi(\chi,\kappa)|_{(\chi,\lambda)=(\chi^*,\lambda^*)}]^{-1} b$ and $$\kappa^* = \frac{\lambda^*}{b^T \chi^*}$$

when evaluated at the saddle-node bifurcation point. Now a key theorem is presented for the elaboration of the proposed method for computing the saddle-node bifurcation point in DPDN systems.

Theorem 4 At the saddle-node bifurcation point $(\chi^*,\lambda^*)$, $\kappa^* b^T c^* + 1 = 0$ and $\kappa b^T c + 1 \neq 0$ for $(\chi,\lambda) \neq (\chi^*,\lambda^*)$.

These properties are ideal for designing a test-function which can characterize the SNBP.

Therefore, the preceding theorem suggests the definition of the following scalar function:

$$t_r: \Re^{n+1} \to \Re; \; t_r(\chi,\kappa) = \kappa b^T c + 1. \quad (32)$$

It is proposed to use this function to compute the exact saddle-node bifurcation value $\lambda^*$.

The new test-function $t_r$ defined above is only equal to zero at the SNBP for equation (4). Thus, saddle-node bifurcations of equilibria for system (4) can be completely defined by the following (n+1)-dimensional system of equations:

$$H(\chi,\kappa) = \begin{bmatrix} g(\chi,\kappa) \\ t_r(\chi,\kappa) \end{bmatrix} = 0. \quad (33)$$

It is noted that, although the linear system $g_\chi(\chi,\kappa)c = b$ must be solved at each iteration of the nonlinear solver being used, the matrix $g_\chi(\chi,\kappa)$ is already decomposed for the current step for $g(\chi,\kappa) = 0$. Consequently, obtaining $c = [g_\chi(\chi,\kappa)]^{-1} b$ is a simple matter.

Now, in order to solve this system, good initial values for the unknowns $x$ and $\kappa$ (or $\lambda$) are needed. A good approximation of the bifurcation value and a rough guess of the bifurcation point have already been shown. Therefore, $\overline{\lambda}$ serves as first guess for the parameter $\lambda$ and $x_2$ is a good initial guess in terms of x. The approximation $(\chi_2,\overline{\lambda})$, allows us to compute the new parameter value $$\overline{\kappa} = \frac{\overline{\lambda}}{b^T \chi}. \quad (34)$$

which is to be used as an initial guess in solving for the exact bifurcation value $\lambda^*$.

An actual solution of (4) can be obtained given $\overline{\kappa}$ and $g_\chi(\chi,\kappa) = 0$: let $\overline{x}$ be that solution. Finally, using the approximation $(\overline{x},\kappa)$, the bifurcation point $(\chi^*,\lambda^*)$ can be obtained via $(\chi^*,\kappa^*)$, by solving equation (33).

The methodology designed to determine the VCM and VCI is obtained by applying the previous results. This is systematically done by proceeding as follows.

1) Define the test-function $t_s$ as given by equation (18).
2) Use the current (computed) value of $t_s$ and its derivative $$t'_s = \frac{dt_s}{d\lambda}$$

to estimate the intersection of $t_s(\lambda)$ with the $\lambda$-axis. Let $\overline{\lambda}$ be such an estimate.

3) Use $\overline{\lambda}$ along with $x_1$ and the gradient vector information $$\chi'_1 = \frac{\partial \chi_1}{\partial \lambda}$$

to estimate the state values at bifurcation. Let $x_2$ be that estimate.

4) The change of parameters $$\kappa = \frac{\lambda}{b^T \chi}$$

is used to obtain a new system of DPDN equations $$g: \Re^{n+1} \to \Re^n g(\chi,\kappa) = 0, \quad (35)$$

which has a nonsingular Jacobian at $(\chi^*,\kappa^*) = (\chi^*,\lambda^*)$. Compute the new parameter value $\overline{\kappa}$ related to $\overline{\lambda}$:

$$\kappa = \frac{\lambda}{b^T \chi} \quad (36)$$

5) Using the revised system of equations (35), with $(\chi_2, \overline{\lambda})$ as initial guess, solve for $(\chi,\kappa)$ a better estimate of $(\chi^*,\kappa^*)$.

6) Finally, with $(\overline{x},\overline{\kappa})$ as initial guess, solve the characteristic system defining the bifurcation point of $f(\chi,\lambda) = 0$ to get the exact bifurcation point and voltage collapse margin. The bifurcation point $(\chi^*,\lambda^*)$ is the solution of:

$$H(\chi,\kappa)=0. \tag{37}$$

where $H: \Re^{n+1} \to \Re$ is defined in (33) $x \in \Re^n$ and $\kappa \in \Re$. This gives us the sought bifurcation value $\kappa^*$, or in terms of the original parameter $\lambda$:

$$\lambda^* = \kappa^* b^T \chi^*. \tag{38}$$

Relationship between Saddle-node Bifurcation Points and Static Voltage Collapse in Power System Networks In the past few decades, a number of major electric power system breakdowns have been singled out for their apparent unpredictability, as well as for similarities in their pattern of occurrence. They have followed sudden disturbances, as well as progressive heavy load increases, and are manifested by at first slowly decreasing system voltages magnitudes (over minutes or hours) which then abruptly drop, unresponsive to operator-induced emergency control actions. Such cases have been recently recorded in France (Dec. 19, 1978 and Jan. 12, 1987), Canada, Belgium (Aug. 4, 1982), Sweden and Japan. These events have been termed Voltage Collapse (VC) phenomena.

Voltage collapse phenomena are now known to result from sudden system contingencies or from load variations occurring on systems subject to particularly high levels of load demands. Voltage collapse has also been attributed to a lack of reactive power support, which can be equivalently regarded as due to increases in load demand. As power systems operate under increasingly stressed conditions, the ability to maintain voltage stability to avoid collapse has become a severe challenge.

In attempting to understand and define a power system model for the analysis of these VC phenomena, a great number of approaches have been considered, featuring increasing complexity and detail. Also, due to the need for modern power systems to operate ever closer to their stability limits, several main issues have been pressing ones for the power systems community. What is the best way to analyze VC caused by contingencies? How about VC caused by load variations? Also of particular concern is the issue of whether to consider voltage collapse a static or dynamic event.

The object is to resolve these issues in a systematic, theoretically sound fashion. Although the diverse issues are somewhat interconnected, as will be evident herein, they retain enough independence that they may still be disjoined for a more thorough understanding and analysis.

Voltage collapse due to contingencies has been studied by several researchers, where the key issues are the existence of a stable operating point after contingency and the estimate of its region of attraction. It is proposed to consider VC resulting from progressive load variations and attempt to emphasize the direct connection between saddle-node bifurcations (SNB) in general nonlinear systems analysis and so-called static voltage collapse in power transmission networks. Further, an object of the invention is to justify the general selection of methods of analysis and models made herein, as well as to utilize a simple power system model for our analysis.

A center manifold model was proposed to explain voltage collapse in power systems due to load variations. This model is based on a mechanism which appears generically in nonlinear dynamical systems and the subsequent system dynamics. It relates the collapse of voltage magnitudes in a power system subject to slow load variations, to the sudden shift in nonlinear system behavior from a stable or quasi-static operation to varying dynamics. Moreover, to its credit, this center manifold voltage collapse (CMVC) model has been shown to encompass many existing models used to explain voltage collapse, such as: the multiple load flow model, the load flow feasibility model, the static bifurcation model, the singular Jacobian model and the system sensitivity model.

Within this new analysis framework, three stages are identified as the system progresses to collapse:

Stage 1: In the first stage, the system is still operating under normal conditions: the system is in a quasi-steady state. Variations of the operating point are very slow and system states closely follow a stable equilibrium point.

Stage 2: The second stage involves the system reaching a critical state: this is a stability limit. It was shown, as we shall see below, that this "steady-state stability limit" corresponds to the occurrence of a saddle-node bifurcation of the stable equilibrium point.

Stage 3: In the third stage, the actual collapse takes place: here the dynamics of the system beyond the critical point take over. At this point, the system states are essentially captured by a center manifold trajectory. This is discussed below.

Stage 1 examines ordinary power system "load flow" solutions, the system operating points, and is concerned about their feasibility. Also, Stage 3, in describing the system dynamical behavior after bifurcation assesses whether the system remains stable or unstable and determines the types of instability: voltage collapse or angle instability. Therefore, the CMVC model describes static aspects (Stages 1 and 2) and a dynamic aspect (Stage 3) of the voltage collapse problem. This topic is further elaborated on hereinafter.

The precise mechanisms defining the dynamics of the generators and loads in real electric power systems during the process of voltage collapse are complex, incompletely understood and difficult to model. Dynamical systems are generally mathematically modeled via the use of ordinary differential equation (ODE) formulations. At this point, it would be best to operate under one of the following assumptions:

A1) complete and detailed power system ODE model accurately reflecting the system dynamic trajectory under normal operating and VC conditions is known; or A2) An approximate power system ODE model approximately describing the given system in the VC situation can be defined.

Under the above assumptions, an appropriate general ODE modeled is offered:

$$\dot{\chi}=f(\chi,\lambda), \tag{39}$$

where $x \in \Re^n$ is a state vector and $\lambda \in \Re^m$ is a varying parameter vector. Arriving at system model (39) is key in that we now have a power system model comprised solely of a vector differential equation with well-defined unique solutions. This is in contrast with the differential-algebraic equation (DAE) models with solution trajectories incompletely defined and the understanding of which is still deficient in some areas. All of this serves as motivation for Choice 1: Analyze voltage collapse in electric power systems using an ordinary differential equation model in the form of (39).

In the model selected here, the parameter $\lambda$ defines the degree of real and reactive power loading in some linear manner. This loading varies in time so that $\lambda$ is, in fact, a function of time: $\lambda=\lambda(t)$. Nonetheless, assuming quasi-static load-demand variation, as is the practice in power systems applications, model (39) considers $\lambda$ at given times or short time intervals, such that $\lambda$ is taken to be constant and (39) is, in fact, implicitly:

$$\chi = f(\chi, \lambda),$$
$$\dot{\lambda} = 0 \quad (40)$$

Now that (i) the electric power system has been modelled in the form of a general nonlinear dynamical system, and (ii) considered the mode of evolution to VC and its mode of occurrence as described by the three stages, it becomes apparent that voltage collapse can be associated with saddle-node bifurcations of equation (39). Interpret the three stages of the VC process in terms of a saddle-node bifurcation of nonlinear dynamical system equilibria, leading to the center manifold voltage collapse model.

Figure 10:
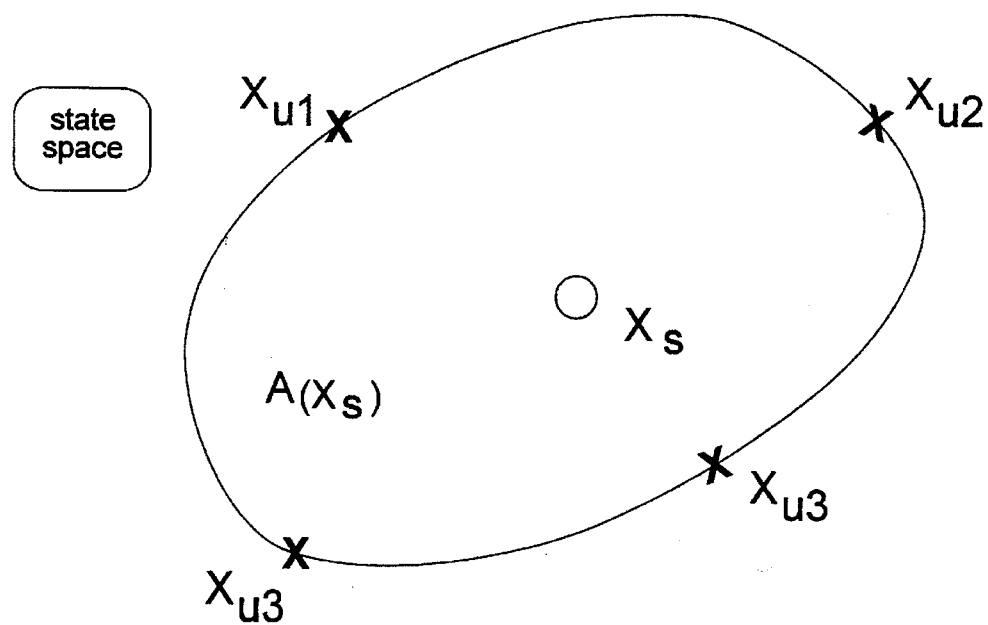
FIG. 10 depicts a graph of sample SEP $x_s$ in its stability region $A(\chi_s)$ and UEPs on the boundary.
Figure 11A:
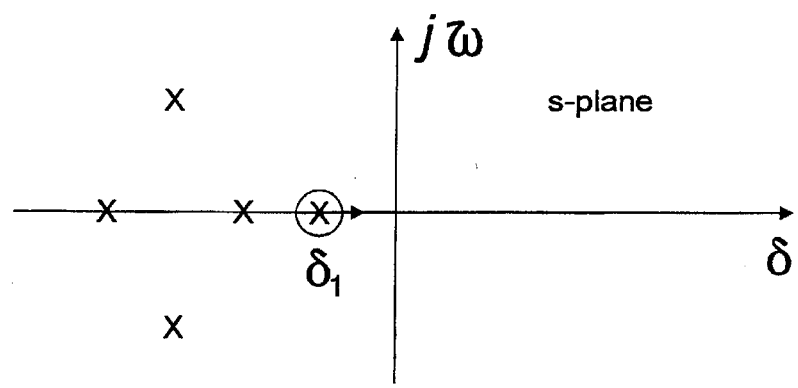
FIGS. 11a and 11b illustrate graphs of system eigenvalues before bifurcation.
Figure 11B:
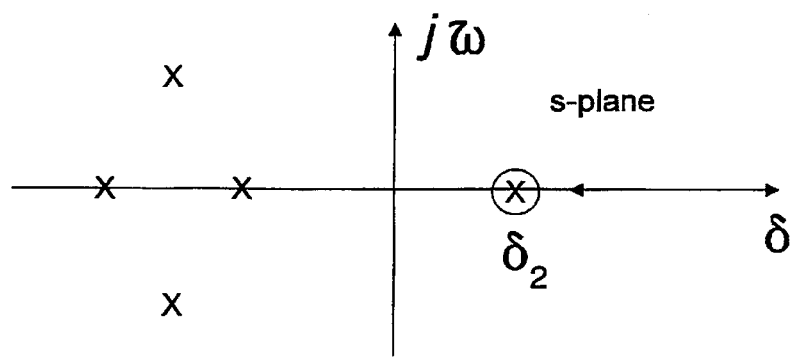

The power system under consideration is initially at (or near) a stable equilibrium point (SEP) $x_s(\lambda_0)$ sitting in its stability region $A(\chi_s)$, with the current load demand defined by the parameter vector $\lambda_0$ (FIG. 10). Mathematically, this means that the Jacobian matrix $$J_s = \frac{\partial f}{\partial \chi}\bigg|_{(\chi_s, \lambda_0)}$$

only has eigenvalues with negative real parts. When the system is close to collapse, a single one of these eigenvalues is purely real and approaches zero (FIG. 11a). A number of unstable equilibrium points (UEPs) exist on the boundary $\partial A(\chi_s)$ of the stability region $A(\chi_s)$. The Jacobian matrices evaluated at these points have at least one eigenvalue with positive real part (FIG. 11b).

Figure 12:
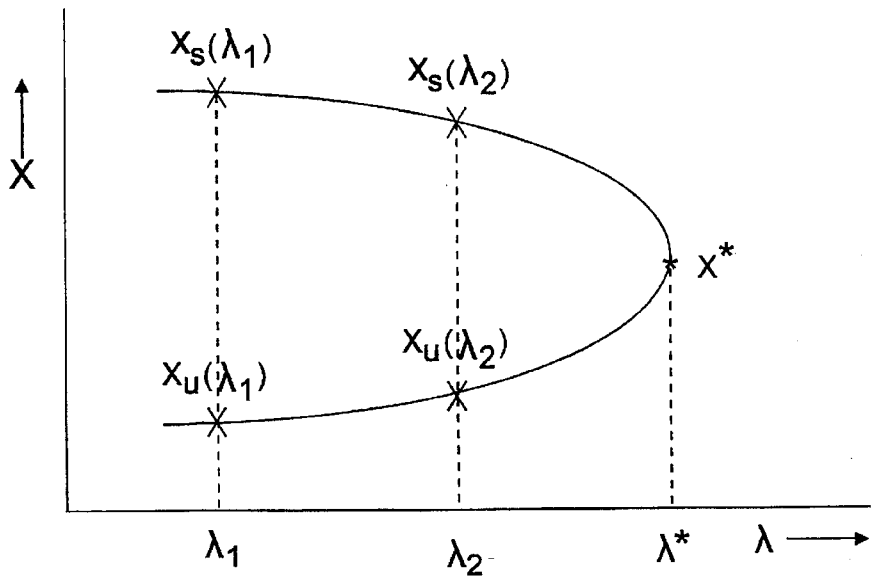
FIG. 12 shows a graph of the locus of a system SEP $x_s(\lambda)$ and UEP $x_u(\lambda)$ leading to bifurcation.
Figure 13:
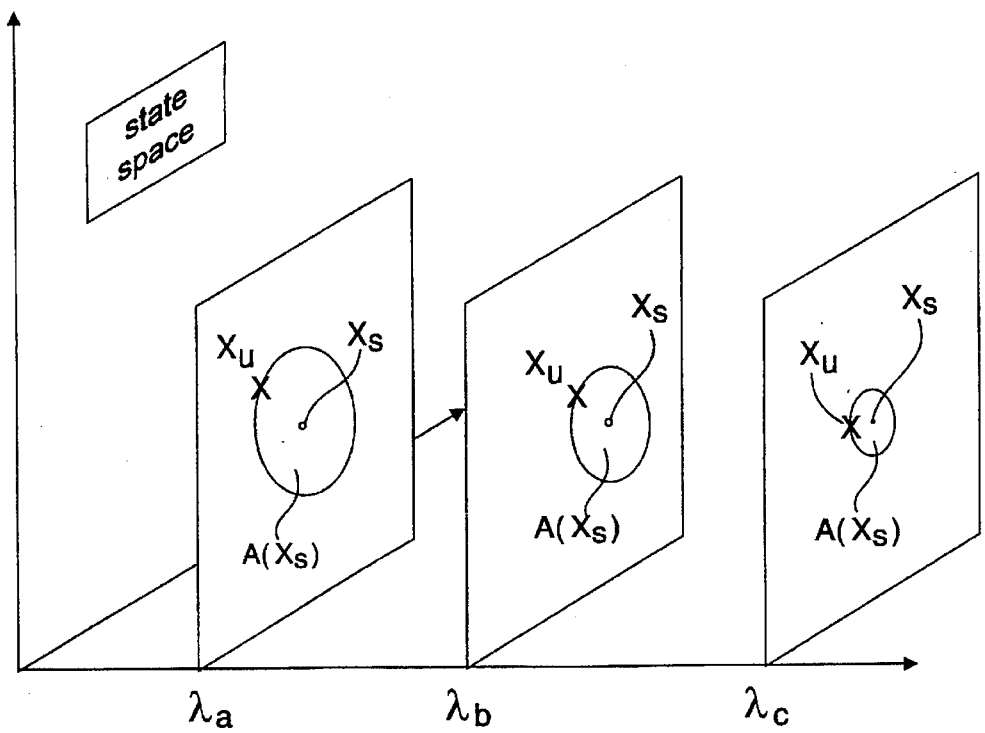
FIG. 13 depicts a graphical depiction of a one-parameter, two-dimensional system evolving toward bifurcation.

As the operating conditions fluctuate and load demand changes slowly (i.e., the parameters $\lambda$ vary quasi-statically), in general, the system continuously progresses to nearby stable equilibria. This corresponds to Stage 1 of the three-stage approach. It will be shown later that these SEPs are given by the load flow solutions under given operating conditions. This is a normal, stable operating state. However, a generic (i.e., typical) manner in which the system can lose stability is when $\lambda$ varies in such a way that $x_s$ coalesces with a UEP $x_u$ on $\partial A(\chi_s)$ (FIGS. 12 and 13). If the variation of $\lambda$ can be (at least locally) parameterized by a single real scalar, then (39) is assumed to be in a class of generic one-parameter systems, and it is shown that the Jacobian matrix $J_u$ evaluated at $x=x_u$ has exactly one eigenvalue with positive real part. As the system moves toward bifurcation, that eigenvalue approaches zero (FIG. 11b). At the coalescence, the parameter takes on a critical value, $\lambda^*$ for example, and the two EPs form a single, special equilibrium point $\chi^* = x_s(\lambda^*) = x_u(\lambda^*)$ for which the Jacobian matrix has exactly one zero eigenvalue, the other eigenvalues have negative real parts: $\chi^*$ is called a saddle-node bifurcation point (SNBP) (FIG. 12).

Figure 14:
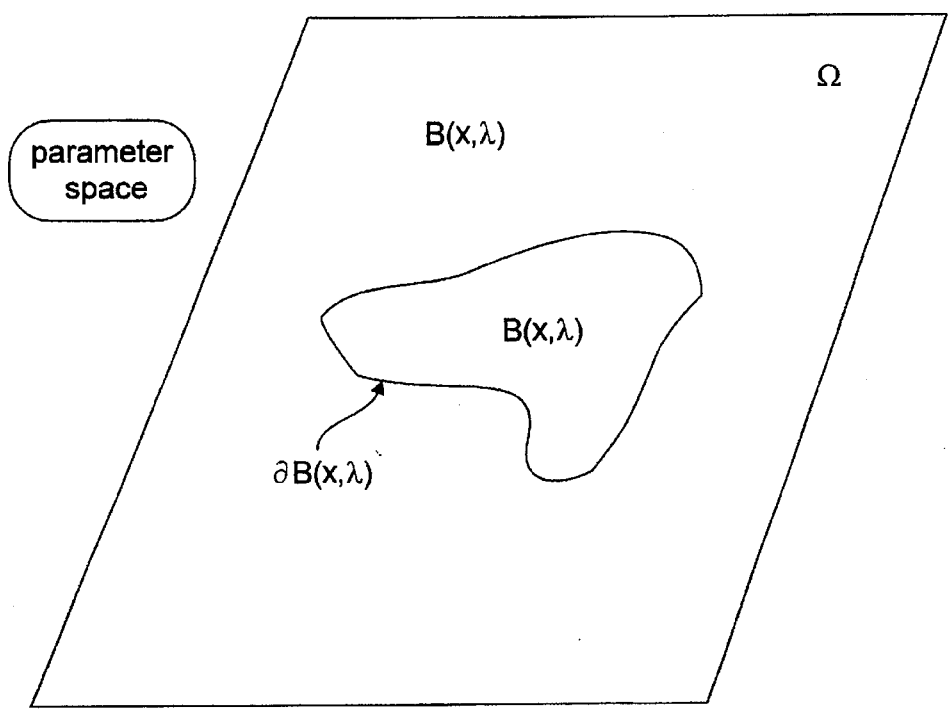
FIG. 14 illustrates a graph of the "feasibility region" in the parameter space of load demands.

In the parameter space, say $\Omega$, within which the parameter vector $\lambda$ varies, (i.e., the space of load demands), the preceding developments imply that there exists a region, say $B(\lambda)$ such that, when $\lambda \in B(\lambda)$, an SEP of interest $x_s(\lambda)$ exists in the state space and has a stability region $A(\chi_s)$ (FIG. 14). Outside of $B(\lambda)$, there does not locally exist a stable equilibrium point, therefore the boundary of the "feasible region" $B(\lambda)$, denoted $\partial B(\lambda)$, is a critical boundary where the parameter vector takes on a limit value $\lambda^*$ for which the SEP $x_s$ and a UEP $x_u$ coalesce into the saddle-node $\chi^*$ as described above.

Figure 15:
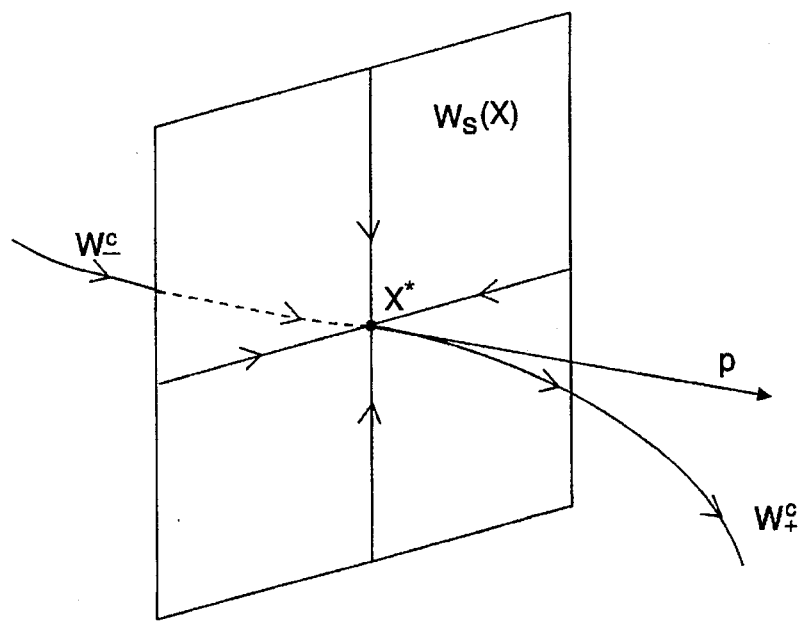
FIG. 15 shows a schematic representation of a center manifold voltage collapse model.

Under the conditions of the preceding paragraphs, system loss of stability and voltage collapse can be explained via the CMVC model as follows. The Jacobian matrix evaluated at $\chi^*$ has one zero eigenvalue, and the real parts of the other eigenvalues are negative. The system Jacobian evaluated at this point is singular and its rank decreases by one. The eigenvector p that corresponds to the zero eigenvalue points in the direction along which the two vectors $x_s(\lambda)$ and $x_u(\lambda)$ approached each other. There is a curve made up of system trajectories which is tangent to eigenvector p at $\chi^*$. This curve is called the center manifold of $\chi^*$ and is the union of a system trajectory $W_-^c$ converging to $\chi^*$, the equilibrium point $\chi^*$ itself and a system trajectory $W_+^c$ diverging from $\chi^*$ see (FIG. 15). If the parameter $\lambda$ increases beyond the bifurcation value $\lambda^*$, then $\chi^*$ disappears and there are no other equilibrium points nearby.

Recall that before the bifurcation occurs, the system state is tracking its stable equilibrium point. Therefore, at the moment the bifurcation occurs, the system state is in a neighborhood of $\chi^*$. Hence, if the system trajectory is near $W_+^c$ at the moment that the bifurcation occurs and if $\lambda$ remains fixed at its bifurcation value $\lambda^*$, then the system trajectory moves near $W_+^c$. The system dynamics due to the bifurcation are then determined by the position of $W_+^c$ in the state space If $W_+^c$ is positioned so that some of the voltage magnitudes decrease along $W_+^c$, then we associate the movement along $W_+^c$ with voltage collapse. This is the center manifold voltage collapse model.

The center manifold voltage collapse model can be summarized as follows. Suppose the general power system model represented by equation (39) has a saddle-node bifurcation at $(\chi^*, \lambda^*)$. The dynamics at the bifurcation are described by motion along the system trajectory $W_+^c$ starting near $\chi^*$. If some of the bus voltage magnitudes decrease along $W_+^c$, then the movement along $W_+^c$ is a model for voltage collapse.

1) The mode of loss of stability or collapse described above is termed typical and generic because it is robust and will occur generally in practice.

2) There are two generic ways one-parameter families of dynamical systems can bifurcate: saddle-node and Hopf bifurcations. Saddle-node bifurcation is chosen for the CMVC model to represent voltage collapse because the other generic bifurcation, Hopf bifurcation, leads to an oscillary behavior which has not generally been observed during the onset of voltage collapse, which exhibits a monotonic decrease in voltage magnitudes.

The development of the CMVC model has thus motivated another choice in the process of analyzing voltage collapse.

Choice 2: The center manifold voltage collapse model will be used to describe analytically and represent the voltage collapse phenomenon in electric power systems.

The term "point of collapse" is used to designate a value of the parameter $\lambda$, i.e., the load demand configuration which first causes the previously stable system to start collapsing. The determination of such points in the parameter space ahead of time is of great importance, as previous knowledge of these points would signal an emergency status before collapse occurred, giving operators monitoring the system a chance to take some appropriate action in an attempt to avoid it.

The usefulness of the static approach in the prediction of voltage collapse in currently stable systems has already be stated. Now examine the options in choosing a valid model for the prediction of VC in power system networks.

As opposed to simulating the actual dynamics involved during the collapse phase, the prediction of VC conditions from normal operating modes does not require an exceedingly high level of modelling detail. Focusing on the existence of saddle-node bifurcations in general nonlinear dynamical systems, the combined results of these two analyses have shown the coexistence of corresponding, nearby saddle-node bifurcation points in the theoretically exact original system description (including slow and fast dynamics)

$$\dot{\chi} = F(X, \lambda) \quad (41)$$

and an appropriately reduced model of (41), say:

$$\dot{\chi} = f(\chi, \lambda). \quad (42)$$

Furthermore, the relationship between bifurcations of the dynamic model (42) and a related purely static model is presented. Compare the nonlinear models:

$$0 = g(\chi, \lambda) \quad (43)$$

and $$\dot{\chi} = f(\chi, \lambda) = h(g(\chi, \lambda)) \quad (44)$$

where $h(0)=0$. In this case, the solutions of (43) are equilibria of (42) and the bifurcations of the solutions of (43) are bifurcations of equilibria of (42).

The implications of the preceding two paragraphs are of great importance in power systems. They suggest reversing the current trend of increasing complexity in power system modelling in favor of the judicious choice of simpler, theoretically validated, reduced representations, particularly where VC prediction is concerned. Concretely speaking, the standard power system load flow (PSLF) equations are precisely a well-known static system, the solutions of which yield the (stable) operating point of the (dynamical) power system under normal operating conditions. They can thus be used to compute and analyze bifurcation of equilibria of the power system in the manner suggested above and, consequently, to predict the onset of voltage collapse. This leads us to the following decision.

Choice 3: In order to predict the onset of the voltage collapse phenomenon in electric power systems, a reduced model (42) of the actual system will be studied. Also,
i) compute and refer to its equilibria as the solutions of the static model (43);
ii) the saddle-node bifurcations of the solutions of (43) are the SNBs of the equilibria of the dynamical model (42) and will thus represent the initial point of voltage collapse for the power system represented by the model (42).

Consider a power system network under normal operating conditions. Let the system state be $x \in \Re^n$. The current operating point $x_0$ is a stable equilibrium point sitting in its stability region $A(\chi_0)$. Let $\lambda = [P_{01}, \ldots, P_{0n}, Q_{01}, \ldots, Q_{0n}]$ be the vector parameter for an m-generator, n-load-bus system. The $P_{0i}$ and $Q_{0i}$ are the real and reactive load demands at bus i respectively.

As the operating conditions change slowly, the parameter vector varies (quasi-statically by assumption). This implies that the system continuously progresses to nearby operating points (stable equilibria) which are successive solutions of a perturbation of the previous system. However, in the parameter space $\Omega$, there exists a region $B(\lambda)$ outside of which the operating point becomes unstable and at the boundary $\partial B(\lambda)$ of which saddle-node bifurcation (as described in the previous sections) starts occurring (FIG. 14).

Let $\lambda_{\alpha 0}$ be the parameter vector value at the current operating point $x_0$. For the voltage collapse problem, we need to take notice of three important points in $\Omega$:

1) $\lambda_p$ the parameter values associated with the predicted load demand, the projected pattern of real and reactive load demand in the near future as given by load forecasting;
2) $\lambda^*_{min}$ the point on $\partial B(\chi, \lambda)$ closest to $\lambda_0$ in the parameter space;
3) $\lambda^*$ the critical parameter value along the predicted direction (toward $\lambda_p$): i.e., the parameter value most likely to cause a voltage collapse in the system if it progresses linearly toward the predicted load demand pattern.

Two principal voltage collapse margins (VCM) can be defined from the current OP:

Definition 2 $\Delta \lambda_{min}$ is the smallest variation in the parameter $\lambda$ which brings the system to the bifurcation boundary:

$$\Delta \lambda_{min} = |\lambda_{min} - \lambda_0|.$$

Definition 3 $\Delta \lambda$ is the smallest variation in the parameter $\lambda$ which brings the system the bifurcation boundary along some given predicted direction:

$$\Delta \lambda = |\lambda^* - \lambda_0|.$$

Several aspects of the topic of locating $\lambda_{min}$ have been studied extensively. This invention is concerned with finding $\lambda^*$ and computing $\Delta \lambda$. Due to the nonlinearities and high dimensions of practical power systems, these projects are not trivial. Thus, given the complexities embodied in these tasks, we now define an "index" which will allow quick estimations of these quantities before actually calculating them.

Definition 4 A voltage collapse index (VCI) for an electric power system is a real scalar quantity which depends on the operating point, disappears at a point of voltage collapse for the system, and is locally non-zero elsewhere. More specifically, $\tau(\chi, \lambda)$ is a VCI if, given a point of voltage collapse $(\chi^*, \lambda^*)$ :

$$\mathcal{T} : \mathcal{R}^N \times \mathcal{R} \to \mathcal{R},$$

$$(\chi, \lambda) \neq (\chi^*, \lambda^*) \Rightarrow \mathcal{T}(\chi, \lambda) \neq 0$$

and $$\lim_{(\chi, \lambda) \to (\chi^*, \lambda^*)} \mathcal{T}(\chi, \lambda) \to 0$$

Let $\tau = \tau(\chi, \lambda)$ be a rapidly obtainable approximation of the VCM $\Delta \lambda$. From Definitions 3 and 4, it is clear that (when properly obtained) $\tau$ is a suitable VCI. An efficient means of computing this index $\tau$ is shown below.

Figure 16:
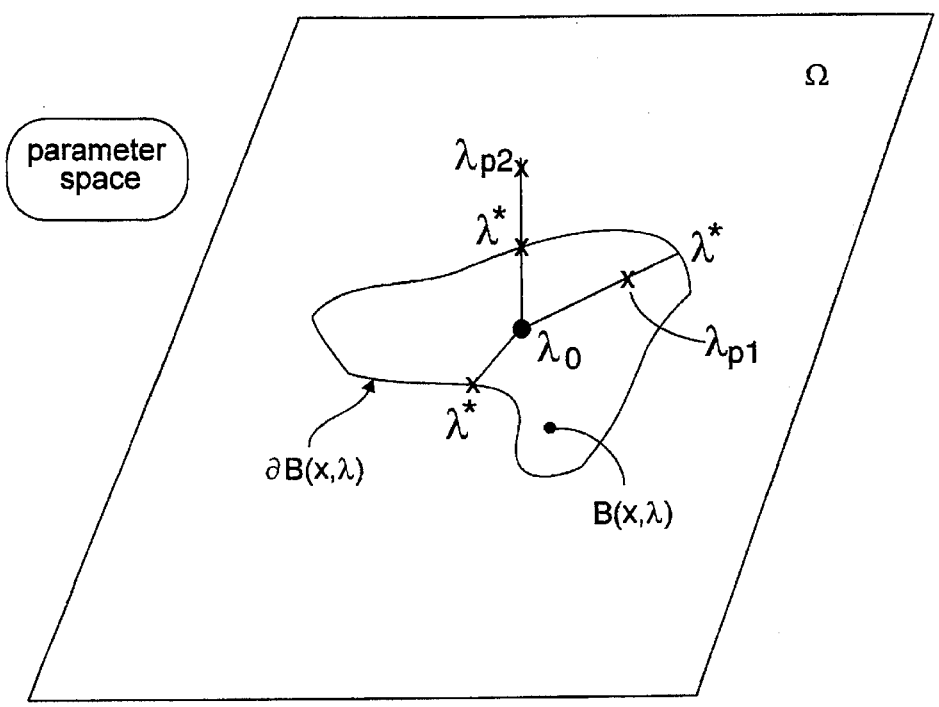
FIG. 16 depicts in graphic form the critical points in the parameter space.

If $\lambda_p = \lambda_{p1}$ lies inside $B(\lambda)$, i.e., if $\lambda_p 1 < \lambda^*$, then it is safe to let the system evolve as predicted: the vector $\Delta \lambda_1 = \|\lambda^* - \lambda_0\|$ indicates the expected load demand margin available. On the other hand, if the predicted value $\lambda_p = \lambda_{p2}$ lies outside of $B(\lambda)$, i.e., if $\lambda_{p2} \geq \lambda^*$, then the predicted operating point will lead to a voltage collapse: $\Delta \lambda_1$ again indicates the load demand margin left to operate with, and steps should be taken to prevent the system from progressing too much in that direction. This is illustrated in FIG. 16.

Remark:

If $\lambda^*_{min}$ is far enough from $\lambda_0$ that it is not reachable by a small perturbation of $\lambda=\lambda_0$, then $\lambda^*_{min}$ may have no particular bearing on the problem, since the change in system load demand does not lead it in the direction of $\lambda^*_{min}$. In such a case $\lambda^*$ is of most importance. Otherwise, $\lambda^*_{min}$ may be of most concern. In normal operations, most situations tend to be in the former category.

The preceding remark highlights the importance of both critical points $\lambda^*_{min}$ and $\lambda^*$ in the avoidance of VC conditions. The voltage collapse problem as considered in this invention is concerned with:

a) Whether or not the system voltage risks collapsing
   at the current operating point, or
   as the network operating conditions progress toward some predicted point.

b) If so, what are the current real and reactive power safety margins before collapse?

c) If not, what are the real and reactive power safety margins left after reaching the predicted point?

Numerical Simulations in the Base Case Analysis

Here we take a look at different phases of the VCI and VCM determination process.

Using the methodology previously described, the test function is modeled as a polynomial function: second-order for variation on a single bus, fourth-order for multiple-bus parameter variation. This choice of a model is justified by the results obtained on various test networks and illustrated in FIGS. 17, 18 and 21.

In this case, a single load bus on which the reactive load demand is varied is chosen for study. Let k denote the index of the component of state variable x corresponding to voltage magnitude on the chosen bus. Here the relevant power systems equations called load flow equations can be written:

$$F(\chi,\lambda)=f(\chi)-\lambda b,$$

where $b=e_k$, the $k^{th}$ unit vector. The index k is such that $x_k=V_l$, the voltage magnitude at the load bus of interest. Some simulation results under these conditions for different test networks follow.

Figure 17:
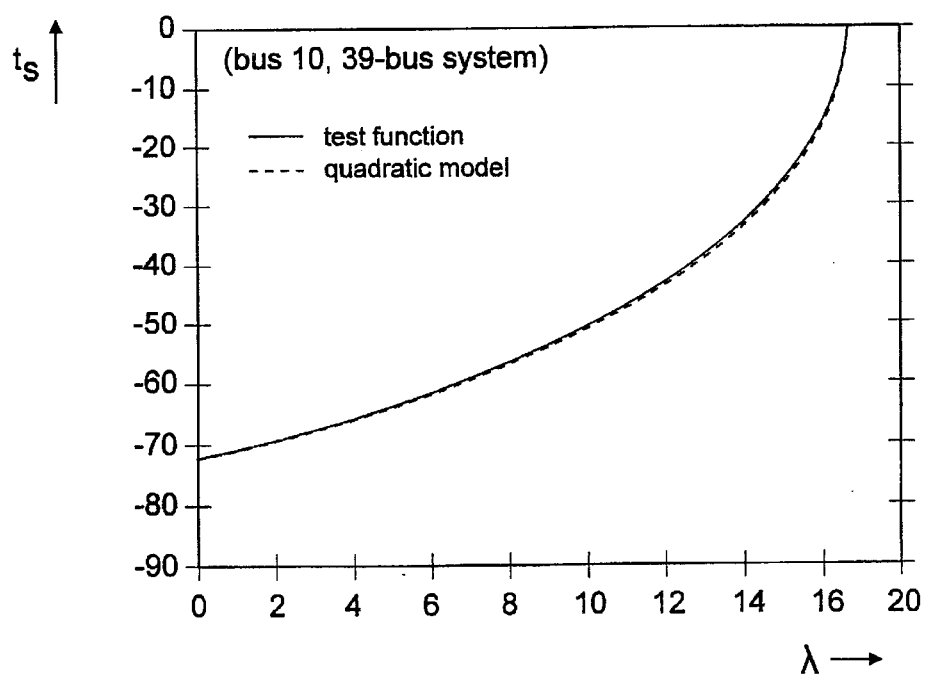
FIG. 17 illustrates a graph of a comparison of test functions $t_s$ with a quadratic model on a 39-bus test system.
Figure 18:
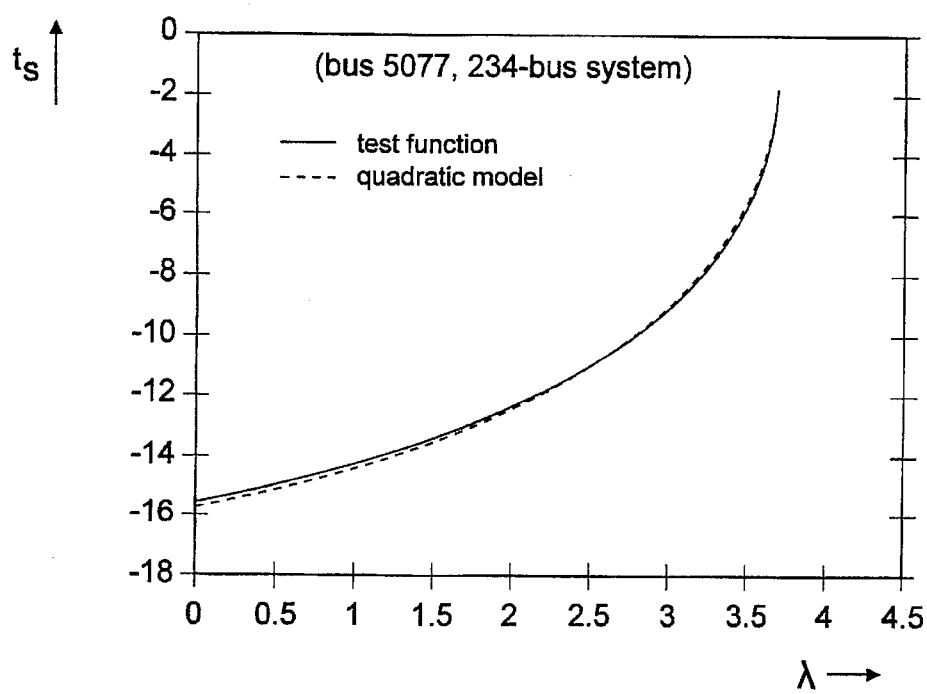
FIG. 18 shows a graph of a comparison of test functions $t_s$ with a quadratic model on a 234-bus test system.
Figure 19A:
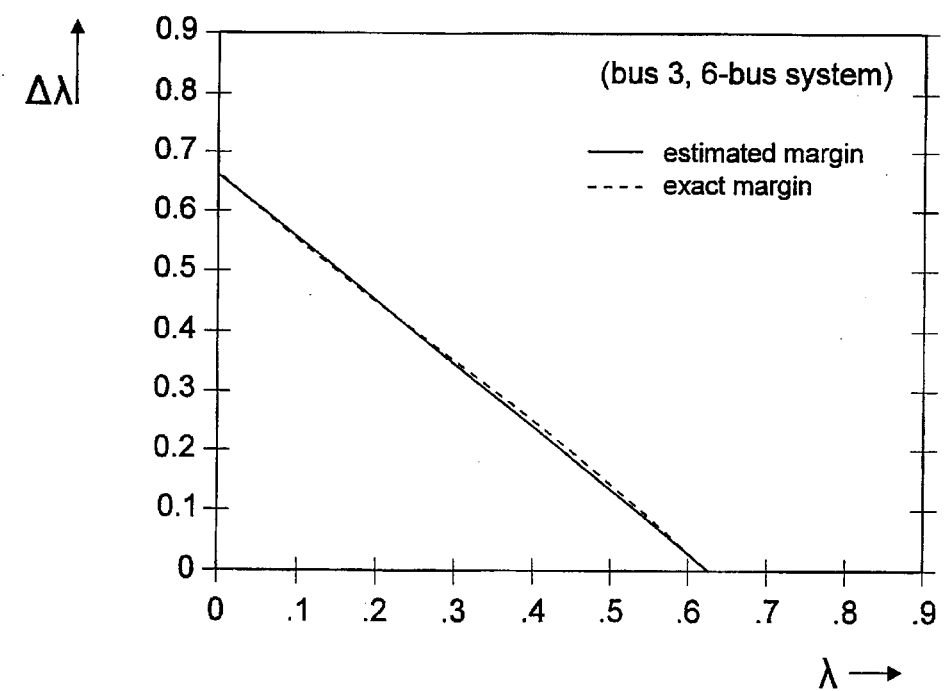
FIGS. 19a, 19b, 19c and 19d respectively depict graphical comparisons of the margin $\tau$ estimated using the test-function $t_s$ with the exact margin $\Delta\lambda$, for different bus systems.
Figure 19B:
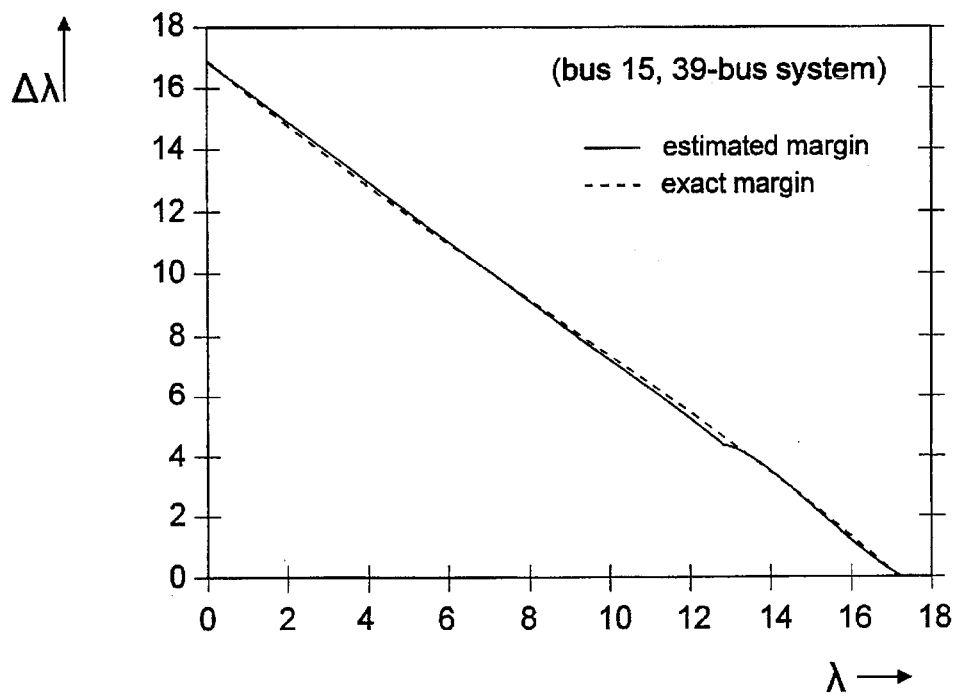
Figure 19C:
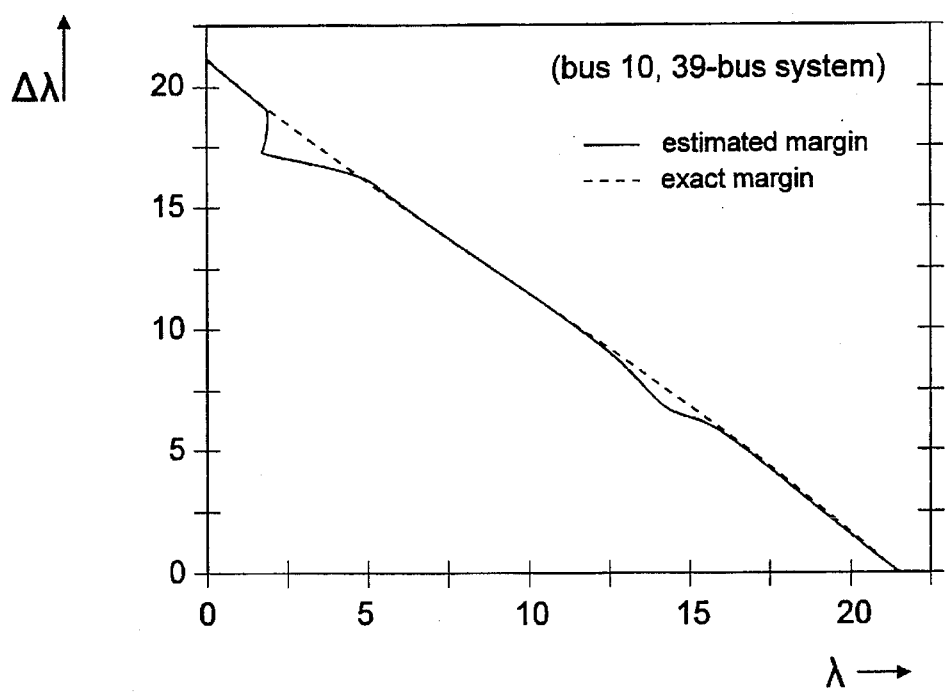
Figure 19D:
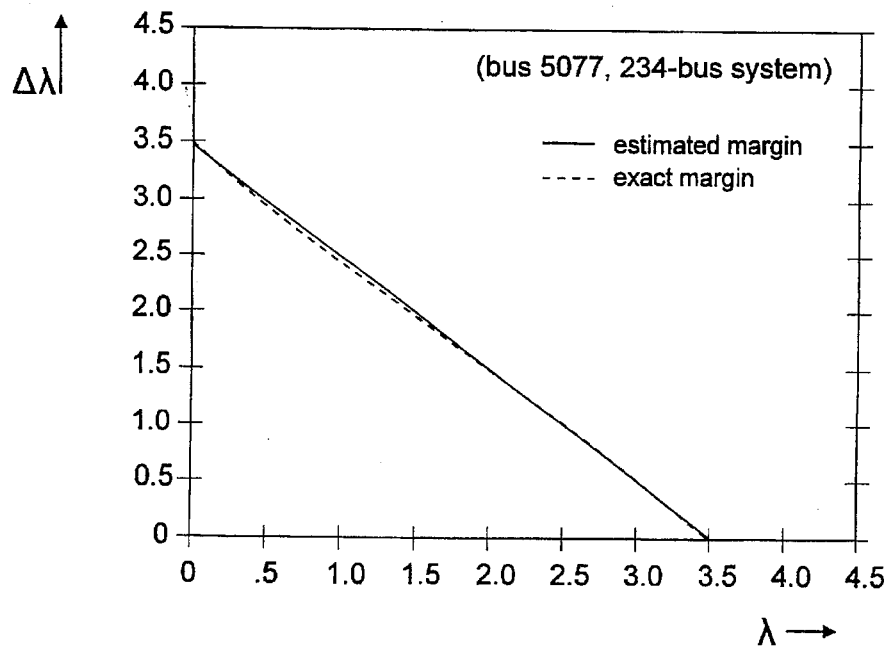
Figure 20A:
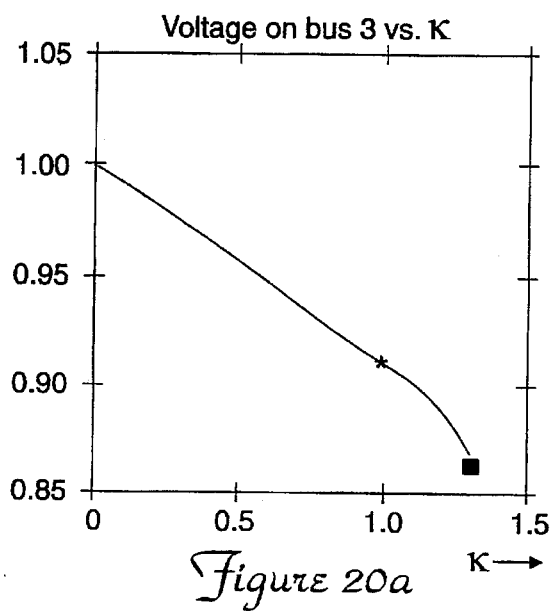
FIGS. 20a, 20b, 20c, 20d, 20e, 20f, 20g and 20h respectively illustrate graphs of relative locations of the bifurcation points with respect to $\lambda$ and $\kappa$ when the parameter is changed for different buses.
Figure 20B:
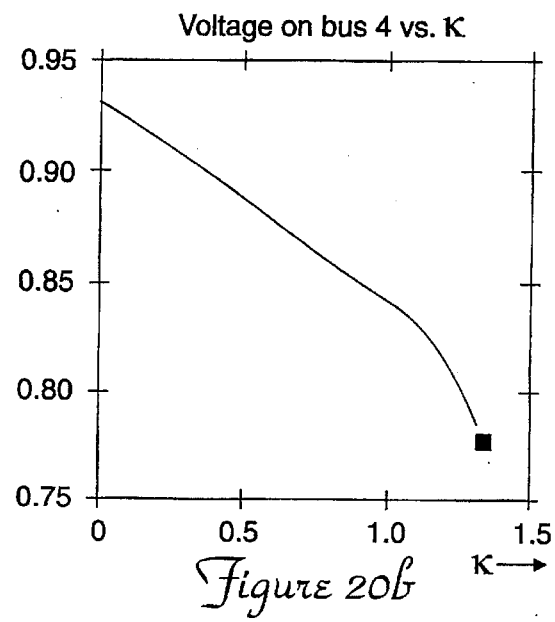
Figure 20C:
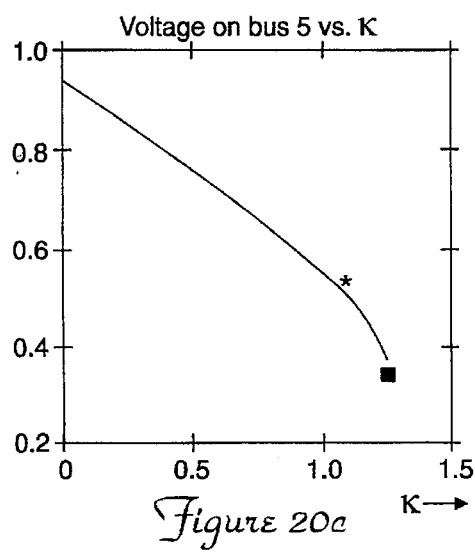
Figure 20D:
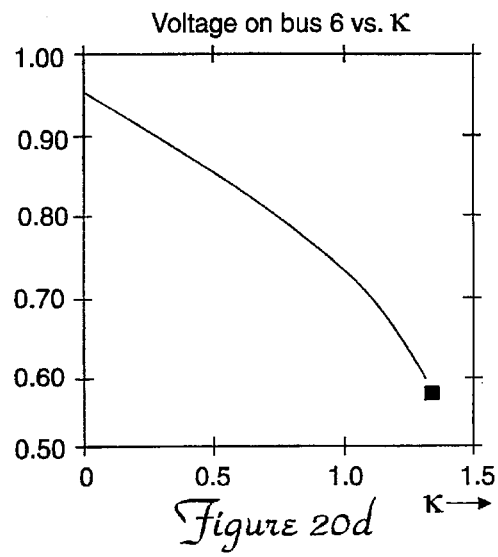
Figure 20E:
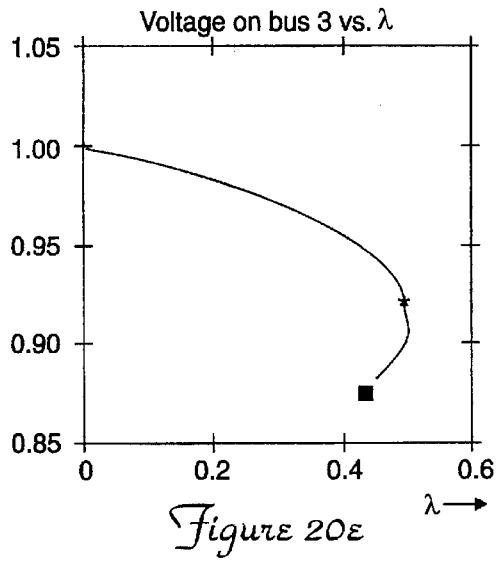
Figure 20F:
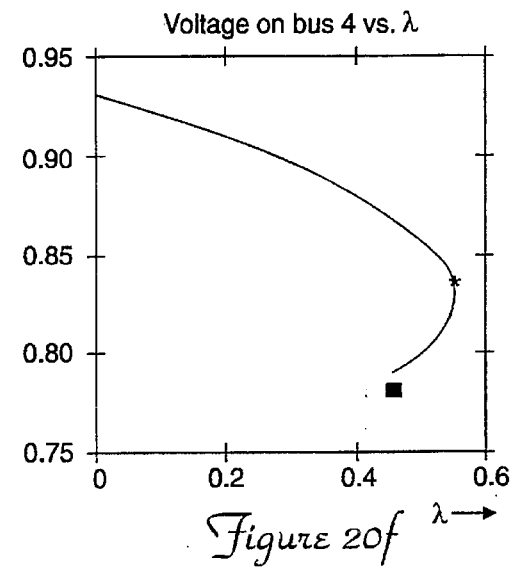
Figure 20G:
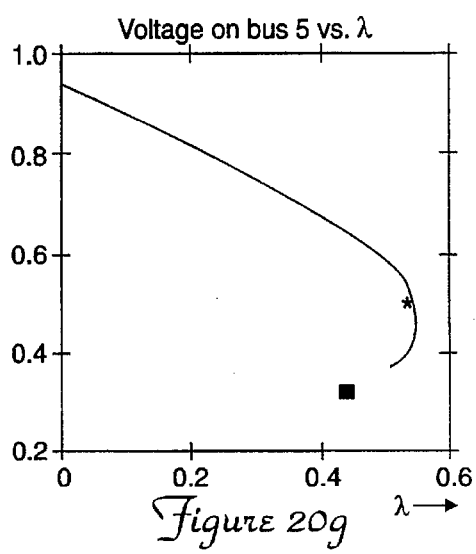
Figure 20H:
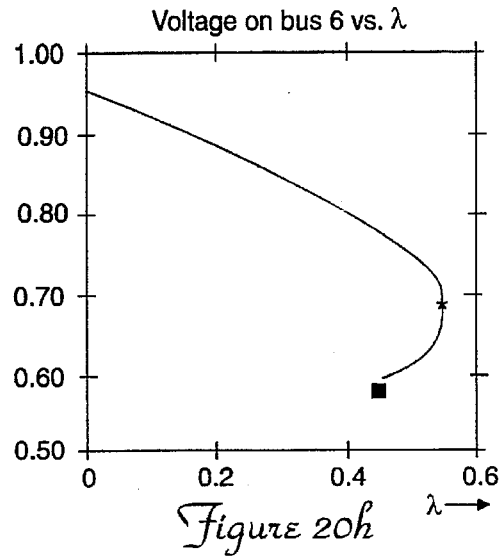
Figure 21:
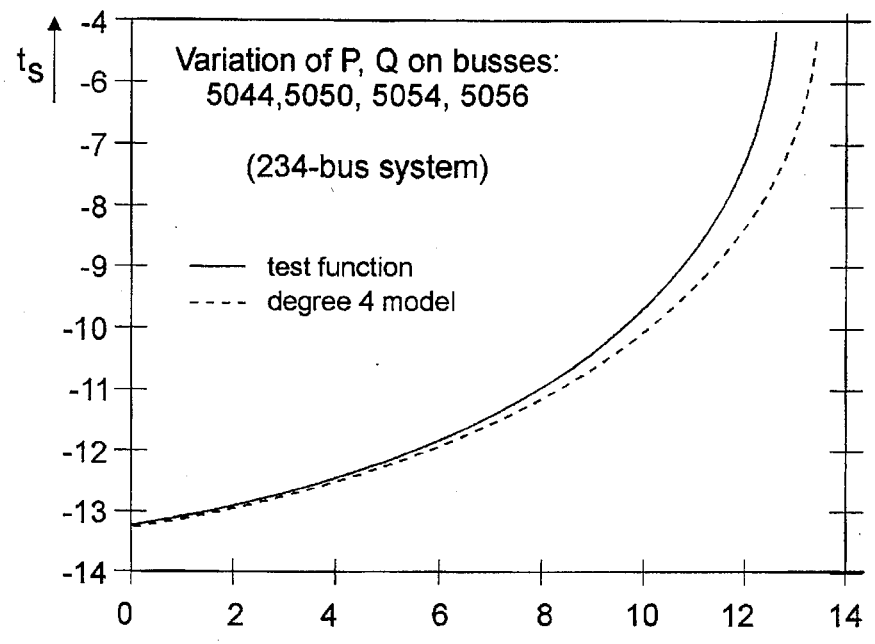
FIG. 21 shows a graph of relative aspects of $t_s$ and a fourth-order polynomial model.
Figure 22A:
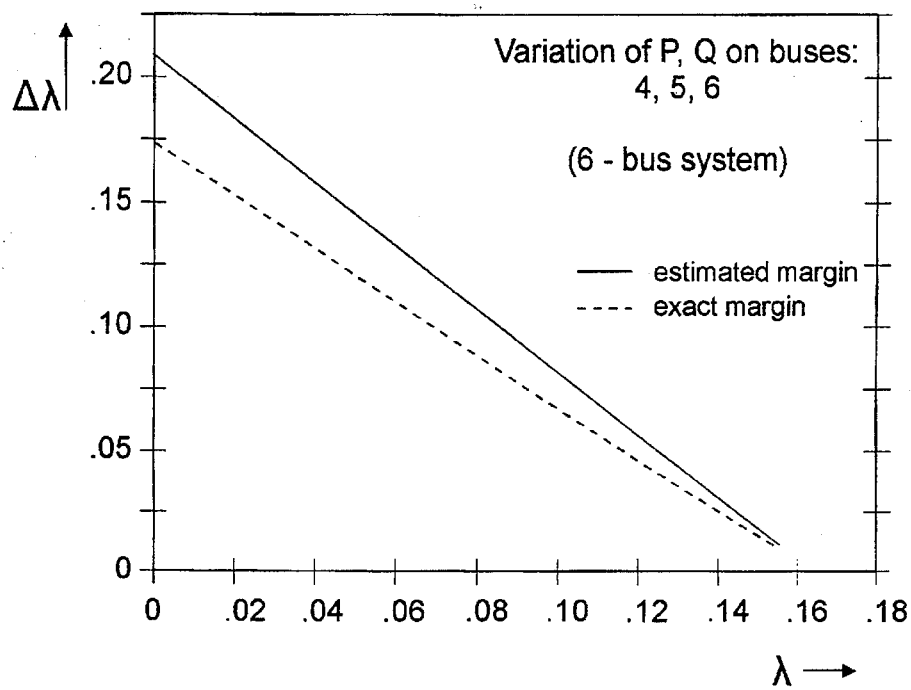
FIGS. 22a and 22b respectively illustrate comparisons of the estimated parameter margins $\tau$ with the exact margins $\Delta\lambda$ in the multiple bus case for two different bus systems.
Figure 22B:
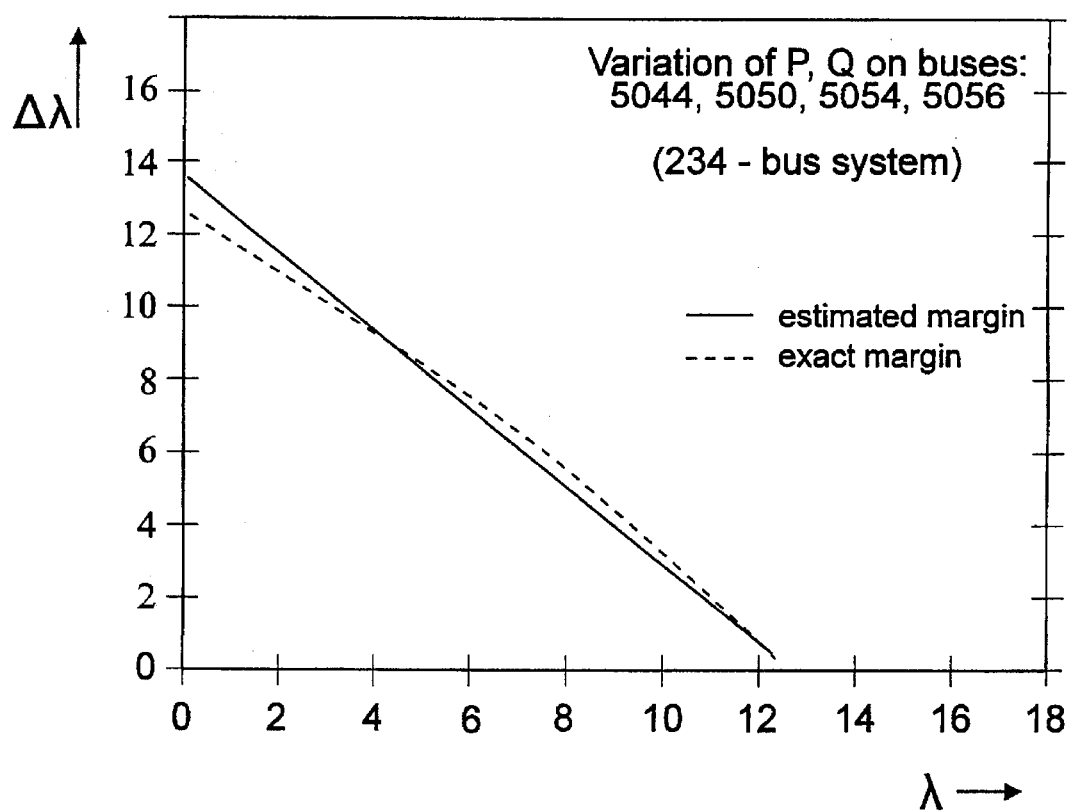

In order to validate the quadratic model chosen to represent the test function $t_s$, we plot both $t_s$ and its quadratic model versus $\lambda$. Both graphs start at $(\chi,\lambda)=(\chi_1,\lambda_1)$ and initially have the same derivative value $t'_s(\chi_1,\lambda_1)$. FIG. 17 shows the result when reactive load demand is varied on bus 10 of a 39-bus system. The results of a similar test on a 234-bus power system, with reactive load variation on bus 5077 are shown in FIG. 17: in this case the two curves are practically indistinguishable from each other.

The accuracy of the bifurcation point estimate estimated and the exact value are both plotted versus $\lambda$. Simulations on a 6-bus system, a 39-bus system and a 234-bus power system yield the graphs in FIGS. 19a–19d.

The bifurcation point is "moved" further along the solution curve of $F(\chi,\lambda)=0$ when the parameter is changed from $\lambda$ to $\kappa$ via the relation $\lambda=\kappa b^T x=\kappa x_l$. This is supported graphically by FIGS. 20a–20h.

Here, with the load flow equations in the same form as previously shown, we may select a "cluster" of load buses for real and/or reactive load variation. Then, $b=\Sigma_{i \in J} \alpha_i e_i$, where $J \subset \{1,2,\ldots,n\}$, $\alpha_i \in \Re$ and the $e_i$ are the $i^{th}$ standard unit vectors in $\Re^n$.

In the multiple-bus case, a fourth-degree polynomial better approximates the test-function. This is shown in the simultaneous plot of $t_s$ and its quartic model in FIG. 21. The test-function $t_s$ and the model are plotted when real and reactive load are varied simultaneously on 4 load buses of the 234-bus system.

The resulting estimate $\overline{\lambda}$ of the SNBP is plotted in comparison to the exact value $\lambda^*$ for both the 6-bus and the 234-bus systems. Real and reactive power variations are considered on several load buses in each case.

The Practical Static Voltage Collapse Problem in Electrical Power Systems

Due to the theoretical and computational complexity of the fully constrained power system dynamical model, it was not possible in the past to devise methodologies to predict the incidence of voltage collapse in realistic EPS network models, while analyses by simulation, on the other hand, are common. Since they usually incorporate practical power system constraints, simulation-based studies may illustrate the process and some mechanisms of voltage collapse, but they do not allow offering applications to practical systems, due to the high computational cost and time consumption of simulating even small systems. Some very detailed theoretical studies include mathematical representations for the elements causing the non-differentiabilities in the EPS models. While this approach has the obvious advantage of possibly taking into consideration the dynamic effects of tap changers and generator VAr limits, such additional complexity does not facilitate the prediction of the point of voltage collapse (PVC). In certain instances, the somewhat counter-productive practice of utilizing a continuous tap-changer model seems to detract from the apparent objective of greater realism. It is proposed to offer a framework and formulation which will allow us to maintain the validity and exploit the benefits of the base case analyses undertaken previously.

The power systems load flow problem has generally been expressed as the equilibrium solutions of the nonlinear dynamical system represented by the differential equation:

$$\dot\chi=f(\chi). \qquad (45)$$

The right-hand side function $f(\chi)$ is implicitly assumed to be some "smooth" (i.e., $C^\infty$) globally defined function in $\Re^n$, often, it is associated with the well-known "power mismatch" function of the EPS load flow equations. Additionally, provisions are usually only introduced at the algorithmic level to account for the physical constraints inherent in modelling practical power systems. In fact, a more useful and precise formulation should both initially account for these constraints, and make use of the known properties and results obtained under the "smooth" $f(\chi)$ assumption. In this way, a framework is provided for the analysis of the practical load flow equations with an already broad theoretical base.

Differential inclusions are a variation of first-order differential equation formulation. Here the derivative vector may take on values in a set of functions instead of just one. They are utilized to model dynamical systems subject to varying control parameters. It is proposed to exploit their notational convenience and use a differential equation model to represent more realistically the practical power system dynamical equations.

Given $$\dot\chi=f(\chi,u), \chi(0)=x_0 \qquad (46)$$

controlled by $u=u(t)$ ("the controls"), $x \in X$, $x \in U$, $f: X \times U \to X$. Consider the set-valued map $$F(\chi)=\{f(\chi,u)\}_{u \in U} \qquad (47)$$

Note that the controls need not appear explicitly in equation (47).

Differential inclusions are largely used for studying ODEs $$\dot\chi=f(\chi),\ \chi(0)=x_0$$

with "discontinuous" right-hand side, by embedding $f(\chi)$ into a set-valued map $F(\chi)$ which enjoys enough regularity to have trajectories closely related to those of the original differential equations. The DIs may also be used to study differential systems which have continuous but "non-differentiable" right-hand side. Differential inclusions generally have a very large set of trajectories. Amongst these, we must select those of particular interest relative to our objective: realistic power system modelling.

A most important and special case of trajectory is given by equilibria. They constitute the equilibrium points of the DI and are solutions of:

$$0 \in F(\chi). \tag{48}$$

A second class of trajectories which will be of particular value are those inside some designated subset of the state space $K \subset X$. These trajectories will be termed "viable" in the sense that they always satisfy given constraints.

i) The viability subset $K(t)$ is a closed subset of the state space $X$ defining admissible constraints on the states $x(t)$ of a dynamical system.

ii) A bounded trajectory $x_0(t)$, $t_1 < t < t_2$ of a dynamical system is viable if:

$$\forall t \in [t_1,t_2],\ x(t) \in K(t).$$

Remarks:

i) The viability subset $K(t)$ may be a constant or time-dependent set.

ii) Clearly the smaller the set $K$, the more restrictive are the constraints on (46) or (47).

iii) Whenever $x(t)$ belongs to the interior of $K$, equation () reduces to the ordinary differential equation:

$$\dot\chi=f(\chi)|_{u(t)=u_0},$$

where $u_0$ is the latest control vector used. This concept is clarified in the following description of evolution of trajectories within the viability subset.

Figure 23:
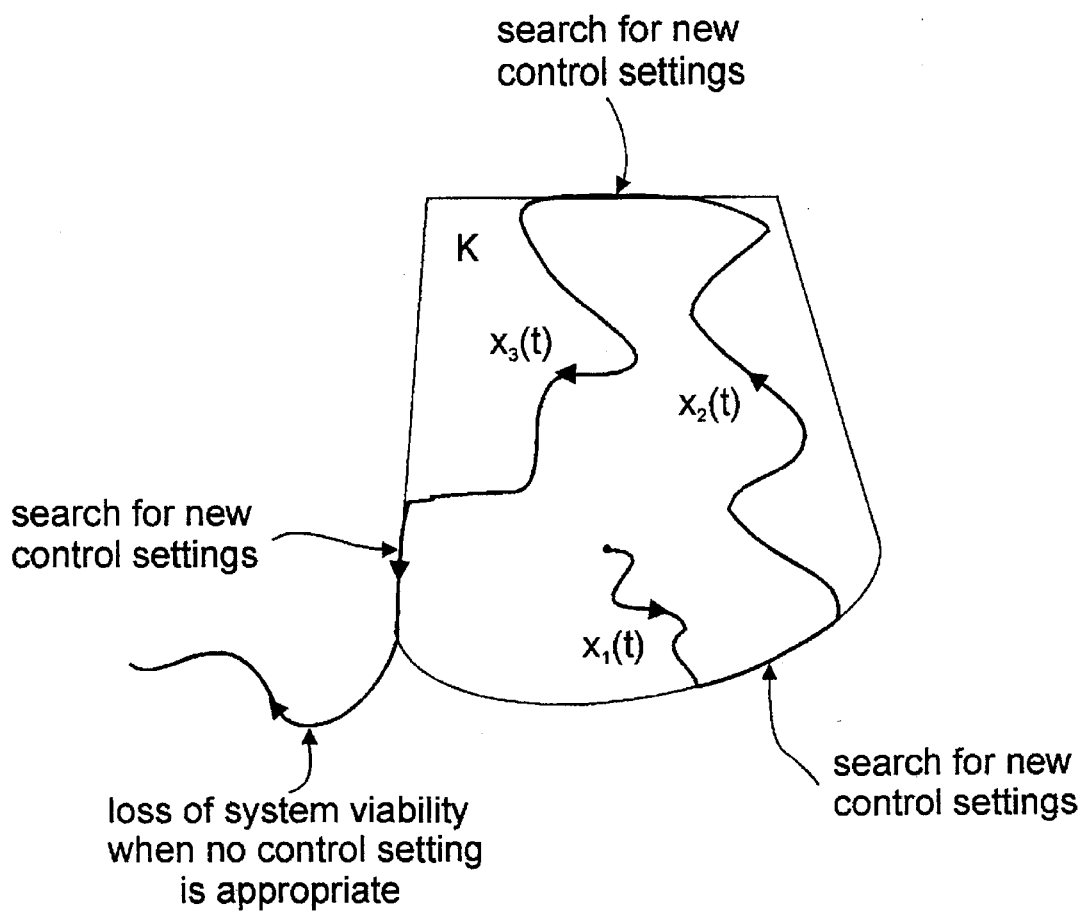
FIG. 23 shows a graphic representation of a viability set K of a differential inclusion and sample trajectories.
Figure 24:
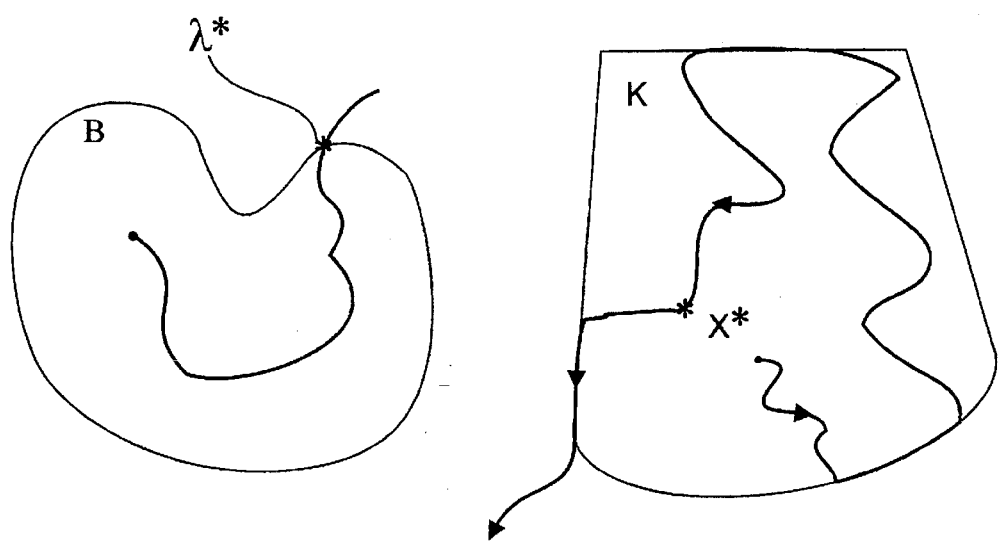
FIG. 24 depicts a graph of the loss of stability while inside the viability set K.

FIG. 23 depicts sample trajectories within a constant viability set $K$. Suppose the controls are set via some predetermined strategy and are only modified to satisfy the operational constraints defined by $K$. Given an initial point and a vector of control settings $u(t)=u_1$ (where $u_1$—and all the other $u_i$—represent constant vectors), as long as $x(t)$ is inside $K$, the trajectory $x_1(t)$ is simply that of the ordinary differential equation $\dot\chi=f(\chi)$ with the controls set to $u_1$.

One of the objectives of the control settings $u(t)$ is to satisfy the constraints defined by $K$. So, when $x_1(t)$ reaches the boundary $\partial K$ of $K$, it is kept there by adjustments of the controls $u(t)$ until an appropriate set of controls, say $u(t)=u_2$, is found so that $x(t)$ returns inside $K$. Then, the trajectory is again defined by an ODE, but this time with the controls fixed at $u_2$.

This sequence—normal trajectory, then search for new control if the trajectory reaches $\partial K$—repeats itself indefinitely under normal, viable operating conditions. However, if a viable control vector cannot be found (as after the portion of trajectory $x_3(t)$ in FIG. 23), then the "death" of the system occurs (so called in contrast to its "viability"). Note that this may imply loss of stability, though not necessarily.

Dynamical systems which depend on a parameter $\lambda \in \Re^m$ ($m \geq 1$) are modelled in a similar manner. Given:

$$\dot\chi=f(\chi,\lambda,u),\ \chi(0)=x_0, \tag{49}$$

utilize the set-valued map:

$$F(\chi,\lambda)=\{f(\chi,\lambda,u)\}_{u \in U} \tag{50}$$

with equilibria defined by:

$$0 \in F(\chi,\lambda). \tag{51}$$

Viability sets and trajectories behave in much the same way. Additionally, trajectories $x_i(t)$ may partially be the result of quasi-static variations as the location of equilibrium points are modified by changes in the parameter value(s). It follows that parameter variations can lead the system to either the boundary $\partial K$ of the viability set $K$, or to the (bifurcation) boundary $\partial B$ of the feasible region $B$, or both.

Differential inclusion formulations seem best suited for real electric power systems modelling. It remains to consider the "discontinuities", in the modelling functions, which are often referred to and debated in the power systems literature.

The right-hand side function from (45) in its full formulation depends on a number of parameters, the values of which define the transmission network being simulated. These are usually called "operational parameters", since they define the mode of operation of the power system under consideration. They may include:

a) generator reactive power (or VAr) limits, which define the maximum amount of reactive power that each generator in the system can safely supply (such a limit can be considered to define a [discrete] control parameter, since the type of the generator node is changed if its VAr limit is reached, and this modifies the network topology—status indicator flags represented by a vector of zeros and ones are sufficient for this purpose);

b) on load tap changers (OLTC) (also Automatic Voltage Regulators [AVR]), which are switchable step-up transformers which can automatically increase or decrease their transformation ratio in discrete increments, in order to raise or lower the secondary voltage when it sags below or rises above a predetermined lower or upper bound, respectively;

c) static VAr compensators (termed "static" to indicate that they have no moving parts—a somewhat misleading terminology), these are basically thyristor-controlled reactors; these inductances are also used to control the voltages;

d) capacitor banks, which can be added in large discrete increments at given nodes of the network as sources of reactive power and, again, help to raise sagging voltage levels.

These control parameters are all subject to discrete variations. Their variation therefore engenders noncontinuous and/or non-differentiable sections of the curves of equilibria of (45). If all the (discrete) settings of these control elements are grouped in one vector $u$, then the differential inclusion formulation adequately represents the power system mathematical model.

The interpretation, in the case of power systems, of the diverse scenarios for system operation listed above reveals a great deal about loss of stability and voltage collapse in real electric power networks. While analysis of specific modes of collapse has contributed to understanding some particular mechanisms of VC, the invention presents a more global picture which will synthesize some of the existing viewpoints on VC mechanisms in power systems. The synthesis will lead to the presentation of a new framework for practical EPS modelling and analysis.

Case 1 In the ideal mode of operation, the power system states vary within the allowable margins, and the load demand is within feasible magnitudes. Under such conditions, a simulation should easily yield stable load flow solutions which are inside K.

Case 2 In some occurrences, stability may be lost within the viability region. Here, although voltages and angles are within acceptable limits, the load demand is such that the system loses stability and the voltage may begin to collapse. Control actions are initiated when the states reach the limit values, but since the system being dealt with is now inherently unstable, these actions will be unsuccessful.

This sequence of events could possibly occur in a system in which a large amount of voltage and angle profile compensation has already been effected, with capacitor banks, SVCs and OLTCs, for example. The artificially high voltage magnitudes and low voltage angles in some sense mask the proximity of the bifurcation boundary, leaving the power system in a precarious situation if the system monitors are unaware of this state of affairs. Simulations will have trouble converging to a load flow solution; most likely, they will not converge at all.

This is precisely the case dealt with by the aforementioned "base case analysis". The EPS model basically reverts to an ODE with the control vector fixed at the latest settings obtained (this is the third branch of trajectories in FIG. 24). Inside K the right-hand side function $F(\chi,\lambda)$ of the differential inclusion simply reduces to the right-hand side function $f(\chi,\lambda)$ of the ODE and is just as differentiable. Any analysis in this domain K can be carried out using the base case analysis with the controls fixed at the current settings. The base case analysis should reveal the proximity of a saddle-node bifurcation point (SNBP) and compute its location and corresponding parameter value.

Figure 25:
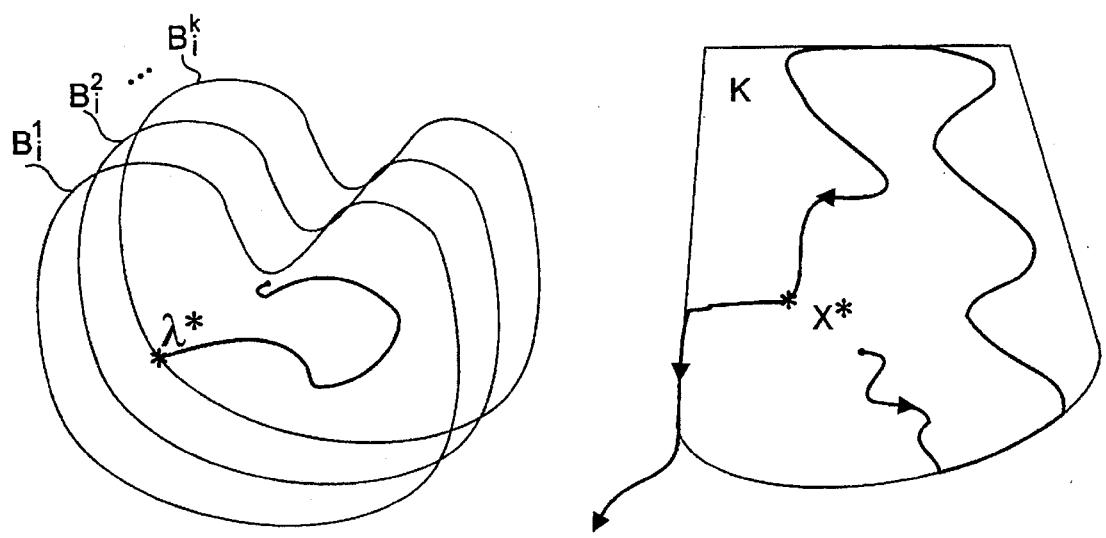
FIG. 25 illustrates a graph of the loss of stability initiated by control actions.

Case 3 In some occurrences of voltage collapse, the phenomenon seems to have been precipitated by the very control actions designed to improve EPS operation. We expect that such a crisis will occur when, due to tap-changer action, generator VAr limits reached, etc., the feasibility region is changed and the parameter space trajectory $\lambda(t)$ encounters or ends up beyond the boundary of the new feasibility region (FIG. 25).

In such a case, the load flow methodology attempting to find an equilibrium solution when simulating the power system fails during the search for new control settings.

This mechanism of loss of stability due to control actions encompasses cases of voltage collapse triggered by tap-changer action. It also explains VC provoked by generators reaching their peak reactive power output.

Figure 26:
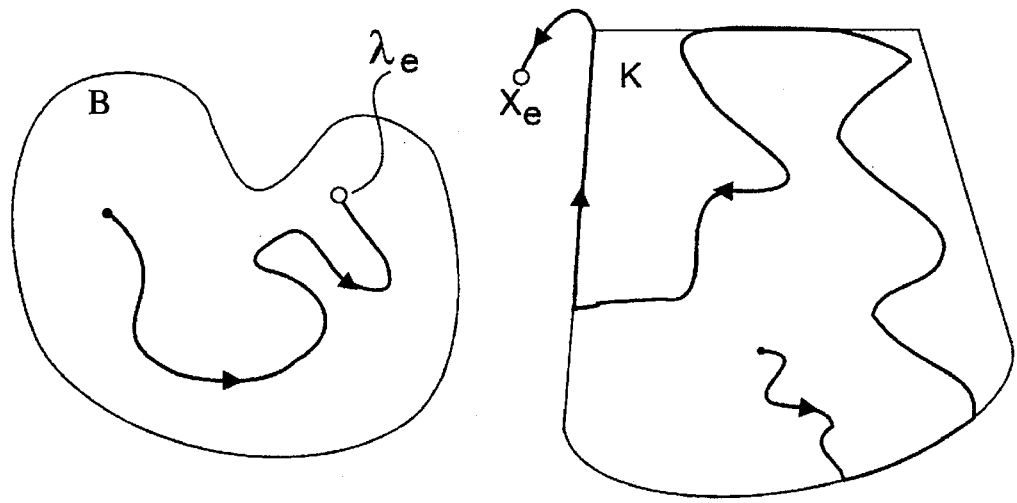
FIG. 26 shows a graph of possible existence of an SEP $(\chi_e,\lambda_e)$ outside of the viability set.

Case 4 In an unsuccessful effort to maintain the viability of the system state, the control settings may saturate at their maximum values without necessarily provoking a loss of stability. At this point the state component of the trajectory will leave the viability set with two basic possibilities:

1) If the parameter component $\lambda(t)$ remains in the feasibility region B, then the state trajectory may approach and track some nonviable limit set (such as a stable EP) outside of K (as in FIG. 26). Such circumstances may be the cause of undesirable operating points with very low voltages, resulting in "brownouts" (so designated because all lights dim in the affected areas). In simulations, a load flow solution (i.e., an EP) is found, but some or all of its components are outside of the domain K. The base case analysis with the control settings (some saturated) controls fixed at the latest values yields an EP $x_e \notin K$ (and an SNBP beyond that point).

Figure 27:
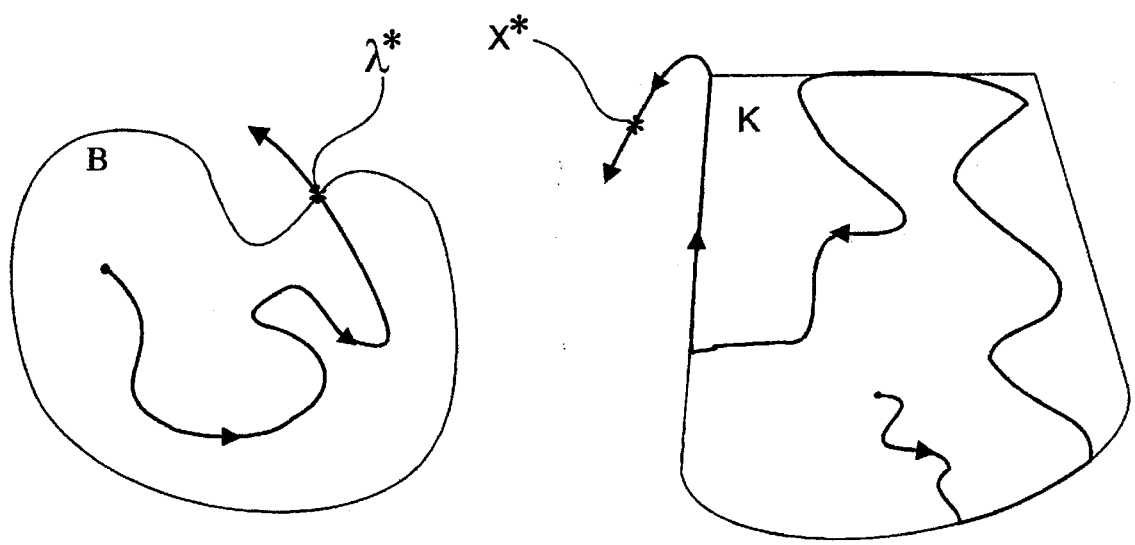
FIG. 27 depicts a graph of the loss of stability while outside the viability set K.

2) If $\lambda(t)$ reaches or crosses the boundary $\partial B$, then the system loses stability after it had lost viability (as in FIG. 27). A base case analysis, applied the control settings fixed as above, will this time yield a saddle-node bifurcation point $(\chi^*,\lambda^*) \notin K$. Here, care must be taken in noting the nonviability of the SNBP in order to avoid misinterpreting the available remaining margin before instability: in the last two cases the remaining margin before nonviability should be noted.

Now it is proposed to include the factors which increase the complexity of practical power systems as compared to the base case conditions, in order to eliminate the previous simplifying assumptions neglecting the operational constraints.

The power systems load flow problem has generally been expressed as the equilibrium solutions of the nonlinear dynamical system represented by the differential equation:

$$\dot{\chi}=f(\chi,\lambda). \tag{52}$$

The right-hand side function $f(\chi)$ was implicitly assumed to be a $C^k$ ($k \geq 1$), globally defined function in $\Re^n$: the well-known "power mismatch" function. However, at the algorithmic level, provisions needed to be introduced to account for the physical constraints inherent in real power systems. A precise formulation is introduced which accounts for these constraints, providing a framework for the theoretical analysis of practical load flow equations.

The power system model actually looks like (52), subject to a number of operating constraints:

$$\dot{\chi}=f(\chi,\lambda)$$
$$0 \leq g(\chi,\lambda). \tag{53}$$

The constraints represented by the inequality above define the "viability subset" K. K may change with time (i.e., K=K(t)). Let $\lambda$ be a scalar parameter. K may be formally expressed as:

$$K=\{(\chi,\lambda) \in \Re^n \times \Re | g(\chi,\lambda) \geq 0\}. \tag{54}$$

Now the set-valued function $F(\chi,\lambda)$ is defined as:

$$F(\chi,\lambda) \chi \{f(\chi,\lambda)\}_{u \in U}, \tag{55}$$

where $U \in \Re^p$ is the control space and p is the number of control parameters.

Based on the concepts of "differential inclusion" presented above, it follows that the desired solutions of the constrained system (53) are actually those of the differential inclusion:

$$\dot{\chi} \in F(\chi,\lambda). \tag{56}$$

Therefore, the load flow solutions sought are the equilibria of (56), namely the solutions of:

$$0 \in F(\chi,\lambda). \tag{57}$$

Furthermore, to each value of the parameter $\lambda$ (to each given load demand vector) is associated a function, say $f(\chi,\lambda) \in F(\chi,\lambda)$, which has all the properties of (52) as in the base case. Each $f_i$ is defined by a given set of fixed control variable settings (some generators fixed at their limits, tap changer settings, capacitor banks energized, etc.). The complete new EPS model formulation is thus:

$$\dot{\chi} \in F(\chi,\lambda)$$

$$(\chi,\lambda) \in K \tag{58}$$

Figure 28:
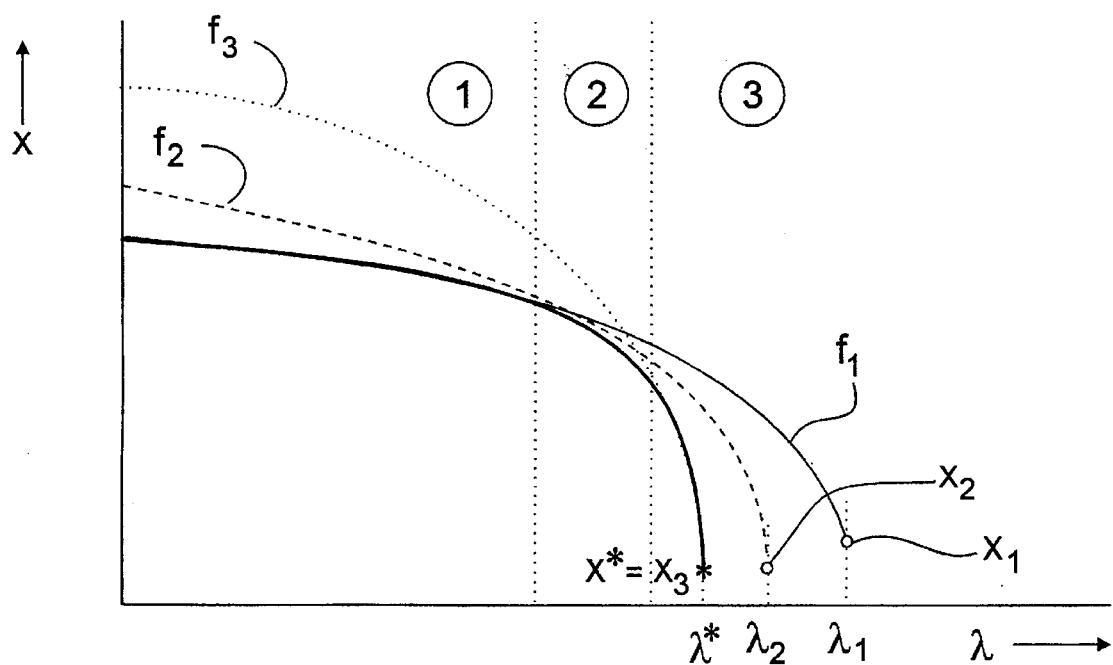
FIG. 28 is a graphic illustration of the existence of the $f_i$ functions when generator VAr limits are considered.

This notation can be simplified by the knowledge that given each fixed vector of control parameters $u_i$, the model reduces to the simple ODE:

$$\dot{\chi} = f_i(\chi,\lambda), \tag{59}$$

where $f_i(\chi,\lambda) \in F(\chi,\lambda)$. Herein lies the main feature of the framework developed herein. FIG. 28 shows the appearance of some $f_i$ functions, when generator VAr limits are involved.

Reconsider the computation of the voltage collapse index in the case of real EPS systems. The preceding studies of various critical operating scenarios has given us some insight on the appropriate choice of function $f_i$ to use in (59) to model the power system near voltage collapse in order to predict its onset. It is assumed that a feasible and viable operating point $(\chi_0,\lambda_0)$ exists: $x_0 \in K$, $\lambda_0 \in B$ for some given control vector $u_0$ from a set of allowable control settings U. Since the variations in the components of the control vector u only occur in finite increments (or decrements), the following definition on a "boundary" of the allowable set U will be useful. Let $\delta u_i$ denote the smallest valid increment on the $i^{th}$ component of u, and $\delta u$ be the Definition 6 A control vector $\bar{u}$ is said to belong to the boundary of U, denoted $\partial U$, if either
(i) $\bar{u} \in U$, but $u_i-1$ for all indices i corresponding to VAr limit flags, setting them. "on"or:
(ii) $\bar{u} \in U$, but $\bar{u}+e_i\delta u \notin U$ ($e_i$ is the $i^{th}$ standard unit vector) for some index i not corresponding to VAr limit flags.

In other words, when all generators have reached their reactive power limits or at least one other control Setting has reached its maximum value, u is considered to be on the boundary of U.

Where static voltage collapse is concerned, there exists a function $f^*(\chi,\lambda)$ defined for some control vector u* and for which the following holds for some critical EP $(\chi^*,\lambda^*)$:

$$f^*(\chi^*,\lambda^*)=0, \text{ with } \lambda^* \in \partial B, x \in K, \text{ and } u^* \in U. \tag{60}$$

Otherwise at some stage what occurs is:

$$\|f^*(\chi^*,\lambda)\| \geq 0, \text{ with } x \in \partial K \text{ and } u^* \in \partial U.$$

This means that as $\lambda$ (hence, load demand) is increased from the given initial value, either an SNBP is found inside the viable region (as in Case 2 in the above scenarios), or the control options saturate and viability cannot be maintained (Cases 3, 4 and 5). When saturation occurs with u=ū, an SNBP can still be computed for the function $\bar{f}(\chi,\lambda)$ with controls fixed at ū.

In practice, given an operating point $(\chi_1,\lambda_1)$, $f^*$ is found as follows. Let i=1.

1. Near $(\chi_i,\lambda_i)$, the power system model is given by a function $f_i$ defined by the current control variable settings $u_i$. The base case VCI computation method is applied to $f_i$, yielding an approximation $\bar{\lambda}_i$ of the SNB value for $f_i$.
2. If the resulting SNB state $\bar{x}_i \notin \text{int} K$ and if the control vector $u_i \notin \partial U$, then let i=i+1 and adjust u so that $\bar{x}_i \in K$ and go to step 1.
3. If $\bar{x}_i \in K$, then go to step 5.
4. Otherwise, if $u_i \in \partial U$, the system will become nonviable before the SNBP is reached: a warning should be issued (the minimum load level leading to nonviability can be computed: see Remarks below), then go to step 5.
5. $f^*=f_i$ and the VCI is:

$$\tau = \bar{\lambda}_i - \lambda_1. \tag{61}$$

It can be used as an initial guess to compute the exact bifurcation point (EBP) $(\chi^*,\lambda^*)$ for the practical power system.

Remarks:

When control vector saturation is reached ($u \in \partial U$), an iterative process can be used to determine the minimum load level for nonviability. It is known that $x_1 \in K$ and Therefore, there exists a solution with $\lambda_2=\alpha\lambda_1+(1-\alpha)\lambda_i$ for some $\alpha$ such that $0 \leq \alpha \leq 1$. An iterative line search on $\alpha$ can yield the critically viable solution $\lambda_2$. It is possible to define a "viability margin" (VM) $\Delta\lambda_v$ which is then logically:

$$\Delta\lambda_v = \lambda_2 - \lambda_1. \tag{62}$$

A net advantage of the differential inclusion approach is the fact that the power system models can be made as complex and precise as one wishes without reservations on discretely varying, discontinuous or nondifferentiable control parameters. This method is also easily integrated within existing power system load flow programs: mismatch functions parameters are simply made dependent on the conditions on the load and voltage values—this is already current practice in most EPS load flow programs. Ill-conditioning problems in computation of the solutions $(\chi_i,\lambda_i)$ can be avoided via the aforementioned change of parameter method.

EXAMPLE

FIG. 28 illustrates the existence of the $f_i$ functions and the relationship between them. Here, generator reactive power limits are considered and the equilibrium points are traced as the load parameter $\lambda$ is increased.

In region 1, where the load demand level is low, no generators have reached the limit of their reactive power output capacity, the function $f_1(\chi,\lambda)$ is the right-hand side of the ODE model for the system. The curve of equilibria "$f_1$", solutions of $f_1(\chi,\lambda)=0$ shows a bifurcation value of $\lambda_1$. However, for load values in region 2, some generator VAr limits are exceeded, and $f_1(\chi,\lambda)$ is no longer representative of the system. Since $(\chi_1,\lambda_1)$ is outside of region 1 where $f_1(\chi,\lambda)$ is defined, the system will never reach this bifurcating equilibrium and it can be discarded.

In region 2, the load demand level is heavier. One generator has reached its VAr output limit and $f_2(\chi,\lambda)$ defines the system. The corresponding equilibria are given by "$f_2$" and the SNB value is $\lambda_2$. As before, the saddle-node bifurcation point $(\chi_2,\lambda_2)$ is outside of the region where its generating function is valid, so we will fix the necessary generator reactive power output(s) at their limit(s) and go on to the function which is relevant in region 3.

In region 3, similar considerations yield the equilibrium curve "$f_3$" and the SNBP $(\chi_3,\lambda_3)$ Since the latter does belong to region 3, it represents the actual SNBP for the system under study. So $(\chi^*,\lambda^*)=(\chi_3,\lambda_3)$.

In practice, only $f_3(\chi,\lambda)$ is needed to determine $(\chi^*,\lambda^*)$ and the voltage collapse index (which uses an approximation of $\lambda^*$). In large systems, a few $f_i$ may be tested during the search for the Significant function $f^*$. The solution methodology below formalizes these ideas.

Solution Methodology

Here is the stepwise approach designed to determine the VCI, subject to all practical constraints. It is obtained by applying the results of the preceding sections.

1. Let $(\chi_1, \lambda_1)$ be the given operating point. Set i=1.
2. For the power system model function $f_i$, define the test-function $t_s$ as given by equation (18).
3. Use the current (computed) value of $t_s$ and its derivative $$t'_s = \frac{dt_s}{d\lambda}$$

to estimate the intersection of $t_s(\lambda)$ with the $\lambda$-axis. Let $\overline{\lambda}_i$ be such an estimate.

4. Use $\overline{\lambda}_i$ along with $x_i$ and the gradient vector information $$\chi'_i = \frac{\partial \chi_i}{\partial \lambda}$$

to estimate the state values at bifurcation. Let $\overline{x}_i$ be that estimate.

5. Find a valid load flow solution for some $\lambda_{i+1} = \lambda_i + \alpha(\overline{\lambda}_i - \lambda_i)$ ($0 < \alpha \leq 1$), for some $\alpha$ close to the upper bound. Start with $\alpha=1$, then iterate with $\alpha_{new}=0.9\alpha_{old}$ until a solution is found.

6. If $\alpha \neq 1$ then adjust the control settings and set i=i+1 and go to step 2. Otherwise, the desired estimate $\overline{\lambda}_i$ is found and the VCI is given by:

$$\tau = \overline{\lambda}_i - \lambda_1. \tag{63}$$

The corresponding state vector is $\overline{x}_i$.

7. The change of parameters $$\kappa = \frac{\lambda}{b^T \chi}$$

is used to obtain the new system of DPDN equations $$g(\chi, \kappa) = 0.$$

8. Finally, with $(\overline{x}_i, \overline{\lambda}_i)$ as initial guess, solve the new characteristic system:

$$\begin{bmatrix} g(\chi, \kappa) \\ t_r(\chi, \kappa) \end{bmatrix} = 0,$$

where $t_r(\chi, \kappa)$ is previously defined. This relation gives us the sought bifurcation value $\kappa^*$, or in terms of the original parameter $\lambda$:

$$\lambda^* = \kappa^* b^T \chi^*.$$

The voltage collapse margin VCM is given by:

$$\Delta\lambda = \lambda^* - \lambda_1.$$

Simulation Results

Figure 29:
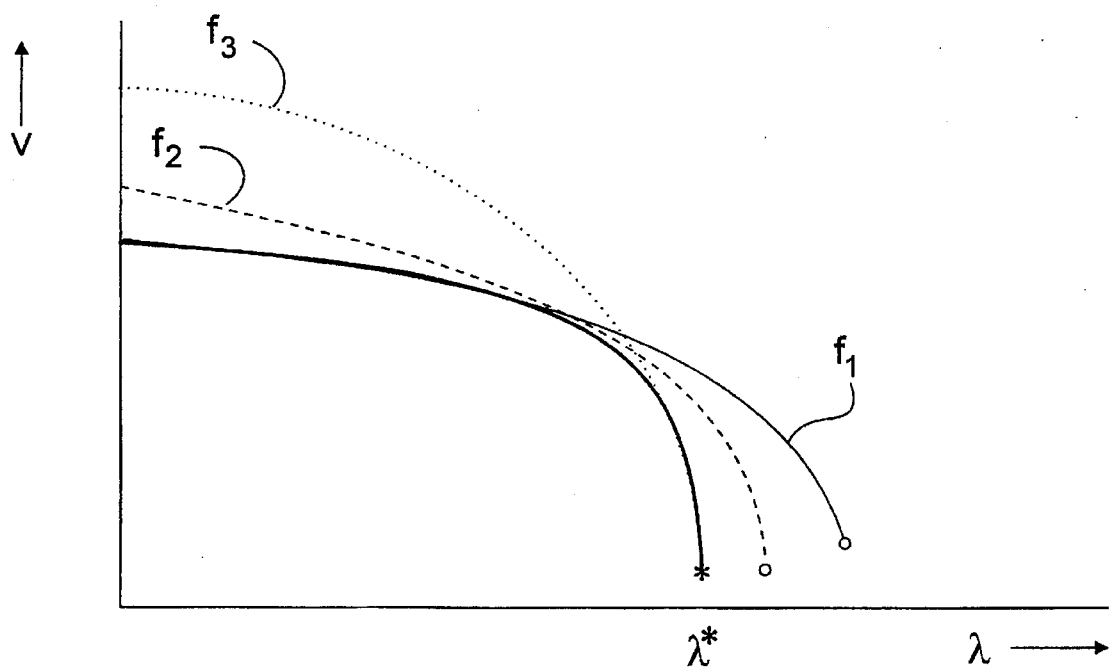
FIG. 29 depicts a graph of the actual voltage equilibrium curve and $f_i$ functions when generator VAr limits are reached.
Figure 30:
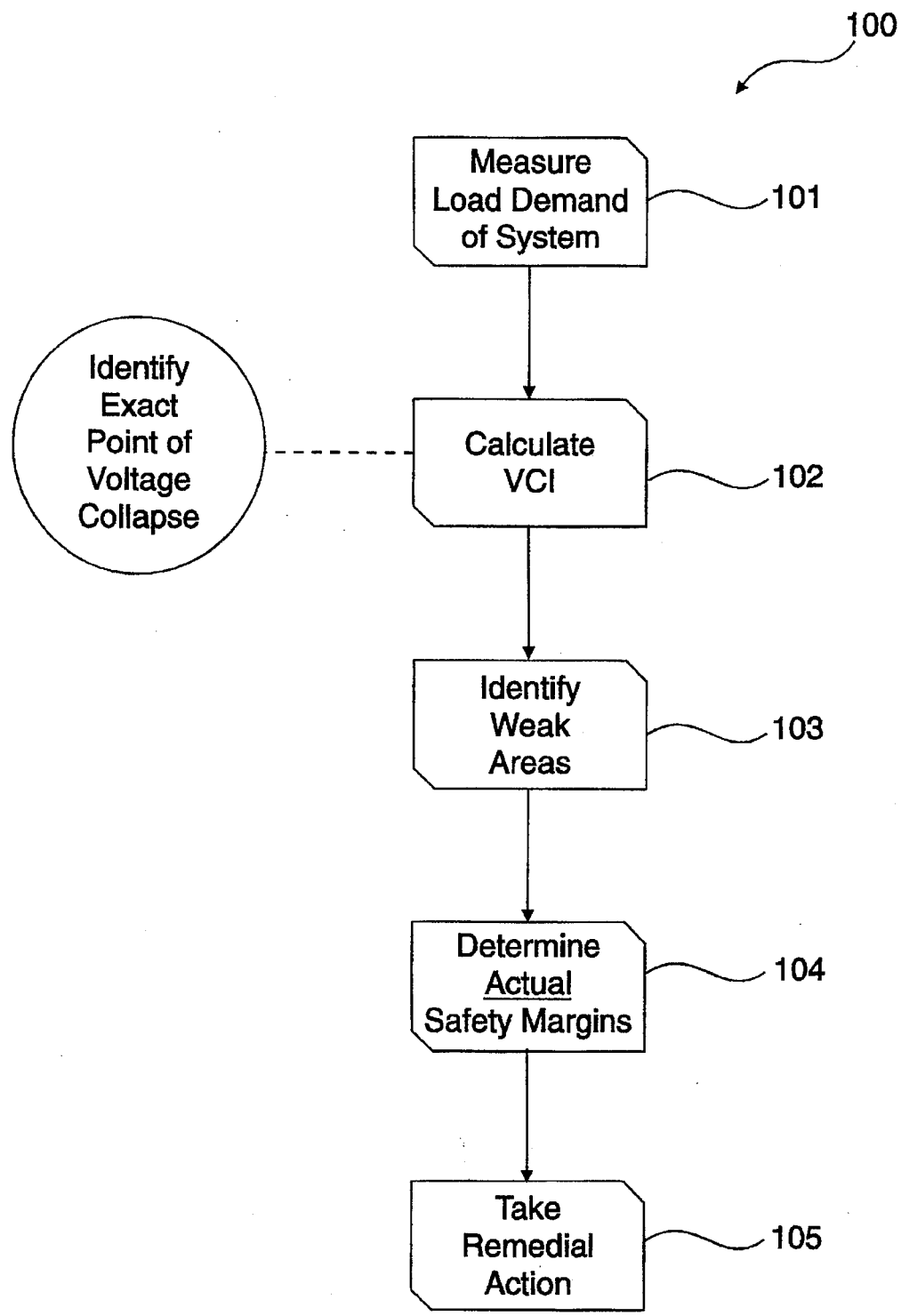
FIG. 30 represents a block diagram of the method of this invention.

In FIG. 29, reactive power limits are the control feature applied to a 39-bus power system network based on the New England test system. This power system has 10 generators and 46 lines. The generators are assumed to be capable of supplying a maximum of 450 MVArs of reactive power each. The lowermost portions amongst the three voltage curves resulting from the smooth functions $f_1(\chi,\lambda)$, $f_2(\chi,\lambda)$ and $f_3(\chi,\lambda)$ constitute the actual V vs. $\lambda$ curve. Each function is $C^\infty$ and the base case study applied to $f_3(\chi,\lambda)$ yields the overall VCI $\tau$. The significant defining the SNBP is given by $f_3$. Computation of the VCI is carried out utilizing the base case method previously presented on $f_3(\chi,\lambda)$. It is possible to do so because, in spite of the non-differentiable points of the EP curves, the resulting test function $t_s$ only depends on $f_3(\chi,\lambda)$ and is a smooth curve since $f_3(\chi,\lambda)$ is smooth.

With the VAr limits set at 450 MVArs (FIG. 29), the initial value for the load parameter was $\lambda_1=2.0$. The first function estimates the bifurcation value at $\overline{\lambda}_1=21.2042$. This result is discarded when the second function used found $\overline{\lambda}_2=9.0363$. Finally, with the third function, the SNB value is estimated at $\overline{\lambda}_3=9.0089$. $f_3(\chi,\lambda)$ proves to be the relevant function so the VCI is given by: $\overline{\lambda}_3 - \lambda_1 = 7.0089$. The exact SNB value is then computed, yielding $\lambda^*=9.0045$. The estimated value is 0.05% more than the actual result. The voltage collapse margin VCM is therefore: $\lambda^* - \lambda_1 = 7.0045$.

When the VAr limits are increased to 500 MVArs, the resulting VCM is also larger (FIG. 29). The SNB value $\lambda^*$ increases from 9.0045 to 9.7363 and the VCM, from 7.0045 to 7.7363.

It is noted that the approximations provided by the VCI tend to be very accurate when only reactive power on one bus is varied.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of preventing voltage collapse in a power-generating system having a grid comprising a plurality of load buses, comprising the steps of:

a) measuring load flow in the power-generating system having a grid comprising a plurality of load buses;

b) calculating a voltage collapse index (VCI) directly correlated to load demands of the power-generating system of step (a);

c) utilizing the voltage collapse index to identify weak areas in the power-generating system;

d) selecting a cluster of said load buses of said grid identified as weak areas for load variation;

e) determining actual safety margins that exist for these weak areas before collapse will occur; and f) shedding power in those selected load buses of said grid that are identified as weak areas, in order to prevent voltage collapse in the power-generating system in accordance with said safety margins.

2. The method of preventing voltage collapse in a power-generating system in accordance with claim 1, wherein as part of the calculation of VCI, said method additionally obtains an exact point of voltage collapse (PVC) for the power-generating system.

3. The method of preventing voltage collapse in a power-generating system in accordance with claim 1, wherein as part of the calculation of VCI and safety margins, said method varies reactive power on at least one of a plurality of buses for the power-generating system.

4. The method of preventing voltage collapse in a power-generating system in accordance with claim 3, wherein reactive power is simultaneously varied on at least two of the plurality of buses for the power-generating system.

5. The method of preventing voltage collapse in a power-generating system in accordance with claim 1, further comprising the step of:

f) determining load-sustaining capacities of the weak areas.

6. A method of preventing voltage collapse in a power-generating system having a grid comprising a plurality of load buses, comprising the steps of:

a) measuring the load demands in the power-generating system having a grid comprising a plurality of load buses;

b) calculating a voltage collapse index (VCI) directly correlated to load demands of the power-generating system of step (a);

c) utilizing the voltage collapse index to identify weak areas in the power-generating system;

d) selecting a cluster of said load buses of said grid identified as weak areas for load variation;

e) determining actual safety margins that exist for these weak areas before collapse will occur; and f) adding power-generating capacity to those selected load buses of said grid that are identified as weak areas of said power-generating system, in order to prevent voltage collapse during heavy load conditions.

7. The method of preventing voltage collapse in a power-generating system in accordance with claim 6, wherein as part of the calculation of VCI, said method additionally obtains an exact point of voltage collapse (PVC) for the power-generating system.

8. The method of preventing voltage collapse in a power-generating system in accordance with claim 6, wherein as part of the calculation of VCI and safety margins, said method varies reactive power on at least one of a plurality of buses for the power-generating system.

9. The method of preventing voltage collapse in a power-generating system in accordance with claim 8, wherein reactive power is simultaneously varied on at least two of said plurality of buses for the power-generating system.

10. The method of preventing voltage collapse in a power-generating system in accordance with claim 6, further comprising the step of:

f) determining load-sustaining capacities of the weak areas.

11. A method of preventing voltage collapse in a power-generating system, comprising the steps of:

a) measuring the load demands in the power-generating system;

b) calculating a voltage collapse index (VCI) directly correlated to load demands of the power-generating system of step a) wherein reactive power is simultaneously varied on at least two of a plurality of buses for the power-generating system; and c) utilizing the voltage collapse index to prevent power failure in said power-generating system.

12. The method of preventing voltage collapse in a power-generating system in accordance with claim 11, wherein an underlying collapse mechanism of said power-generating system is determined to be due to a contingency, said method further comprising the step of:

d) utilizing the voltage collapse index to measure severity of said contingency.

13. The method of preventing voltage collapse in a power-generating system in accordance with claim 11, wherein an underlying collapse mechanism of said power-generating system is determined to be due to a contingency, said method further comprising the step of:

d) utilizing the voltage collapse index to assess whether the system can sustain a contingency without collapse.

14. The method of preventing voltage collapse in a power-generating system in accordance with claim 11, wherein an underlying collapse mechanism of said power-generating system is determined to be due to load variations, said method further comprising the step of:

d) utilizing the voltage collapse index to assess the amount of load increase that the power-generating system can tolerate prior to such collapse.

15. A method of preventing voltage collapse in a power-generating system, comprising the steps of:

a) measuring the load demands in the power-generating system;

b) calculating a voltage collapse index (VCI) directly correlated to load demands of the power-generating system of step (a) wherein reactive power is varied on at least one of a plurality of buses for the power-generating system; and c) utilizing the voltage collapse index to prevent power failure in said power-generating system.

16. The method of preventing voltage collapse in a power-generating system in accordance with claim 15, wherein an underlying collapse mechanism of said power-generating system is determined to be due to a contingency, said method further comprising the step of:

d) utilizing the voltage collapse index to measure severity of said contingency.

17. The method of preventing voltage collapse in a power-generating system in accordance with claim 15, wherein an underlying collapse mechanism of said power-generating system is determined to be due to a contingency, said method further comprising the step of:

d) utilizing the voltage collapse index to assess whether the system can sustain a contingency without collapse.

18. The method of preventing voltage collapse in a power-generating system in accordance with claim 15, wherein an underlying collapse mechanism of said power-generating system is determined to be due to load variations, said method further comprising the step of:

d) utilizing the voltage collapse index to assess the amount of load increase that the power-generating system can tolerate prior to such collapse.

* * * * *